United States Patent
Harms

(10) Patent No.: US 11,914,449 B2
(45) Date of Patent: Feb. 27, 2024

(54) METHODS AND APPARATUS FOR CHARACTERIZING MEMORY DEVICES

(71) Applicant: Micron Technology, Inc., Boise, ID (US)

(72) Inventor: Jonathan D. Harms, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/740,130

(22) Filed: May 9, 2022

(65) Prior Publication Data
US 2022/0261062 A1   Aug. 18, 2022

Related U.S. Application Data

(63) Continuation of application No. 16/276,461, filed on Feb. 14, 2019, now Pat. No. 11,327,551.

(51) Int. Cl.
*G06F 1/3234* (2019.01)
*G06F 1/08* (2006.01)
(Continued)

(52) U.S. Cl.
CPC .............. *G06F 1/3275* (2013.01); *G06F 1/08* (2013.01); *G06F 1/324* (2013.01); *G06F 1/3206* (2013.01);
(Continued)

(58) Field of Classification Search
CPC .............. G06F 11/008; G06F 11/3037; G06F 11/3409; G11C 2029/5002; H04L 2209/56; H04L 2209/26
See application file for complete search history.

(56) References Cited

U.S. PATENT DOCUMENTS 9,799,405 B1    10/2017  Micheloni et al.
10,289,529 B2 *  5/2019  Duale ................. G06F 11/3664
(Continued)

OTHER PUBLICATIONS

Andreopoulos, Yiannis, "Error Tolerant Multimedia Stream Processing: There's Plenty of Room at the Top (of the System Stack)." IEEE Transactions on Multimedia, IEEE, Feb. 1, 2013.
(Continued)

*Primary Examiner* — Vincent H Tran
(74) *Attorney, Agent, or Firm* — Greenberg Traurig

(57) ABSTRACT

Methods and apparatus for using characterized devices such as memories. In one embodiment, characterized memories are associated with a range of performances over a range of operational parameters. The characterized memories can be used in conjunction with a solution density function to optimize memory searching. In one exemplary embodiment, a cryptocurrency miner can utilize characterized memories to generate memory hard proof-of-work (POW). The results may be further validated against general compute memories; such that only valid solutions are broadcasted to the mining community. In one embodiment, the validation mechanism is implemented for a plurality of searching apparatus in parallel to provide a more distributed and efficient approach. Various other applications for characterized memories are also described in greater detail herein (e.g., blockchain, social media, machine learning, probabilistic applications and other error-tolerant applications).

20 Claims, 15 Drawing Sheets

(51) Int. Cl.
  *G06F 1/324*   (2019.01)
  *G06F 11/34*   (2006.01)
  *G06F 11/30*   (2006.01)
  *G06F 11/00*   (2006.01)
  *G06F 1/3206*  (2019.01)

(52) U.S. Cl.
  CPC ........ *G06F 11/008* (2013.01); *G06F 11/3037* (2013.01); *G06F 11/3409* (2013.01); *G06F 2201/81* (2013.01)

(56) References Cited

U.S. PATENT DOCUMENTS

| | | | |
|---|---|---|---|
| 11,256,778 | B2 | 2/2022 | Harms |
| 11,327,551 | B2 | 5/2022 | Harms |
| 2002/0138492 | A1 | 9/2002 | Kil |
| 2003/0216964 | A1 | 11/2003 | Maclean et al. |
| 2005/0286282 | A1 | 12/2005 | Ogura |
| 2007/0261043 | A1 | 11/2007 | Ho et al. |
| 2008/0071939 | A1 | 3/2008 | Tanaka et al. |
| 2009/0129586 | A1 | 5/2009 | Miyazaki et al. |
| 2012/0148044 | A1 | 6/2012 | Fang et al. |
| 2013/0212427 | A1* | 8/2013 | Franceschini .... G11C 29/56008 714/6.13 |
| 2014/0047301 | A1 | 2/2014 | Kurata |
| 2014/0119124 | A1 | 5/2014 | Kim et al. |
| 2014/0143630 | A1 | 5/2014 | Mu et al. |
| 2014/0223208 | A1 | 8/2014 | Eltawil et al. |
| 2014/0245105 | A1 | 8/2014 | Chung et al. |
| 2015/0016191 | A1 | 1/2015 | Tsai et al. |
| 2015/0288710 | A1 | 10/2015 | Zeitlin et al. |
| 2016/0301428 | A1 | 10/2016 | Andrade Costa et al. |
| 2017/0026185 | A1 | 1/2017 | Moses |
| 2017/0083383 | A1 | 3/2017 | Rider et al. |
| 2017/0213597 | A1 | 7/2017 | Micheloni |
| 2017/0371559 | A1 | 12/2017 | Higgins et al. |
| 2018/0075926 | A1 | 3/2018 | Sagiv et al. |
| 2018/0109541 | A1 | 4/2018 | Gleichauf |
| 2018/0336552 | A1* | 11/2018 | Bohli .................... H04L 9/3297 |
| 2019/0004734 | A1 | 1/2019 | Kirshenbaum et al. |
| 2019/0080108 | A1 | 3/2019 | Gomez Claros et al. |
| 2019/0108868 | A1 | 4/2019 | Torng et al. |
| 2019/0130989 | A1 | 5/2019 | Yang et al. |
| 2019/0306230 | A1 | 10/2019 | Purushothaman et al. |
| 2019/0333056 | A1 | 10/2019 | Wilkinson et al. |
| 2019/0391829 | A1 | 12/2019 | Cronie et al. |
| 2020/0143470 | A1 | 5/2020 | Pohl et al. |
| 2020/0192791 | A1 | 6/2020 | Yang et al. |
| 2020/0201697 | A1 | 6/2020 | Torng et al. |
| 2020/0213091 | A1* | 7/2020 | Mai ..................... G06F 12/1408 |
| 2020/0226233 | A1 | 7/2020 | Penugonda et al. |
| 2020/0264689 | A1* | 8/2020 | Harms ............ G11C 29/50012 |
| 2022/0171826 | A1 | 6/2022 | Harms |
| 2022/0187785 | A1 | 6/2022 | Matei et al. |
| 2022/0269332 | A1 | 8/2022 | Harms |

OTHER PUBLICATIONS

Anonymous, "Ethereum Homestead Documentation." Retrieved from the Internet <https://buildmedia.readthedocs.org/media/pdf/ethereum-homestead/latest/ethereum-homestead.pdf>, Mar. 1, 2017.
Biryukov, Alex, et al., "Equihash: Asymmetric Proof-of-Work Based on the Generalized Birthday Problem." IACR, International Association for Cyptologic Research, Oct. 27, 2016.
Extended European Search Report, EP 20755302.5, dated Oct. 11, 2022.
Sartori, John, et al., "Branch and Data Herding: Reducing Control and Memory Divergence for Error-Tolerant GPU Applications." IEEE Transactions on Multimedia, IEEE, Feb. 1, 2013.
Siu, Cheng, et al., "A Memory-Hard Blockchain Protocol." 2018 IEEE International Conference on Smart Energy Grid Engineering (SEGE), IEEE, Aug. 12, 2018.

\* cited by examiner

METHODS AND APPARATUS FOR CHARACTERIZING MEMORY DEVICES

PRIORITY AND RELATED APPLICATIONS

This application is a continuation of, and claims priority to, U.S. patent application Ser. No. 16/276,461 of the same title filed on Feb. 14, 2019, and issuing as U.S. Pat. No. 11,327,551 on May 10, 2022, which is incorporated herein by reference in its entirety.

This application is related to U.S. patent application Ser. No. 16/211,029, filed Dec. 5, 2018, and entitled "METHODS AND APPARATUS FOR INCENTIVIZING PARTICIPATION IN FOG NETWORKS", Ser. No. 16/242,960, filed Jan. 8, 2019, and entitled "METHODS AND APPARATUS FOR ROUTINE BASED FOG NETWORKING", Ser. No. 16/276,471, filed concurrently herewith on Feb. 14, 2019, and entitled "METHODS AND APPARATUS FOR CHECKING THE RESULTS OF CHARACTERIZED MEMORY SEARCHES", and Ser. No. 16/276,461, filed concurrently herewith on Feb. 14, 2019 and entitled "METHODS AND APPARATUS FOR MAINTAINING CHARACTERIZED MEMORY DEVICES", each of the foregoing incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Technological Field

The following disclosure relates generally to memory devices. Various aspects of the present disclosure are directed to, inter alia, validating memory search results from characterized memory devices. Specifically, various techniques for validating proof-of-work (POW) memory searches are disclosed.

2. Description of Related Technology

A cryptocurrency is a virtual medium of exchange. Examples of popular cryptocurrencies include Bitcoin (used in the Bitcoin network) and Ether (used in the Ethereum network). Each of these cryptocurrencies use proof-of-work (POW) algorithms to process monetary transactions that are recorded in ledgers that are shared or distributed among a community of peers. Many cryptocurrencies use shared ledgers based on a "blockchain" data structure: a chained sequence of data blocks.

Cryptocurrency "mining" generally refers to cryptocurrency activities that generate or are rewarded monetary value based on proof-of-work (POW). For example, cryptocurrency mining activities may include e.g., verifying and securely adding transactions to the distributed ledger and/or creating new units of cryptocurrency. Ether is considered a "memory hard" or "memory bound" cryptocurrency because their mining algorithms require large amounts of memory to run. More directly, memory bandwidth is the means by which memory hard cryptocurrencies demonstrate POW. In other words, a memory hard cryptocurrency or memory hard application is one in which memory bandwidth or usage is a principal indicator of POW.

As a brief aside, the virtual domain contains no physical conservation laws. In the physical world, a token of value (e.g., a physical coin) cannot be "double spent". Specifically, Alice cannot give a coin to Bob, and then give the same coin to Charlie because of conservation of matter. In contrast, there is nothing that prevents Alice from sending the same digital token to both Bob and Charlie. Proof-of-work (POW) is a virtualized representation of physical entropy (e.g., computational work, memory searches, etc.). A blockchain is a data structure that records accumulated POW; in modern use, blockchains accumulate POW at rates that introduce physical conservation laws into the virtual domain. More directly, a blockchain represents the accumulation of entropy on scales that are physically impractical for malicious parties to attack. For example, cryptocurrencies use a blockchain that is continuously checked by a network of miners to ensure that only valid transactions are added within blocks to the blockchain. Although a malicious party may attempt to generate a false POW, it is physically infeasible to generate a valid POW for the ever expanding blockchain (due to practical constraints on processing power and/or memory). Invalid POW transactions can be identified and rejected by the community of miners in the network. Additionally, in some cases the node or IP address associated with a misbehaving miner or malicious party can experience undesirable consequences; for example, a miner that generates excessive amounts of invalid POW may be banned, kicked from the network, waste resources, fined, and/or penalized.

SUMMARY

The present disclosure provides, inter alia, methods and apparatus for using characterized memories.

In one aspect, a method for accelerating a memory hard application is disclosed. In one embodiment, the method includes: selecting a characterized rate based on a solution density function associated with the memory hard application; searching a characterized memory at the characterized rate with a first processor for one or more solutions to the memory hard application; validating the one or more solutions with a validation memory at a specified rate with a second processor; and responsive to successful validation of at least one solution, providing the at least one solution to the memory hard application.

In one variant, the characterized rate is selected to increase memory bandwidth of the characterized memory.

In one variant, the characterized rate is selected to reduce power consumption of the characterized memory.

In one variant, the memory hard application has a threshold of error-tolerance; and the characterized rate is selected based on a bit error rate (BER) that does not exceed the threshold of error-tolerance.

In one aspect, a memory apparatus is disclosed. In one embodiment, the memory apparatus includes: an array of memory cells; a memory interface; an error correction logic configured to read data from the array of memory cells and provide corrected data via the memory interface; where the memory apparatus is characterized by an uncorrectable fault performance and a first performance under a first operating parameter; and wherein the memory apparatus is configured to store one or more data that identify the first performance and the first operating parameter.

In one variant, the first operating parameter includes an overclocking rate and the first performance includes a bit error rate (BER).

In one variant, the error correction logic categorizes data faults as probabilistic errors or hardware failures. In one such variant, the uncorrectable fault performance is based at least in part on probabilistic errors or hardware failures that cannot be repaired or exceed a limitation of error correcting capability. In one such exemplary variant, the first performance under the first operating parameter is based at least in part on second ones of the data faults categorized as probabilistic errors.

In one variant, each memory cell of the array of memory cells includes a capacitive storage element.

In one variant, each memory cell of the array of memory cells includes a ferroelectric storage element.

In one variant, the memory apparatus is configured to update the one or more data that identify the first performance and the first operating parameter based on historic use.

In one variant, the memory apparatus is configured to update the one or more data that identify the first performance and the first operating parameter based on an increase in uncorrectable fault performance.

In one aspect, a method for using characterized memory is disclosed. In one embodiment, the method includes: executing an error-tolerant application characterized by an error-tolerance threshold; reading one or more data that identify a first performance and a first operating parameter of a characterized memory; and operating the characterized memory for the error-tolerant application in accordance with the first operating parameter based on at least the first performance exceeding the error-tolerance threshold.

In one variant, the operating the characterized memory for the error-tolerant application in accordance with the first operating parameter includes overclocking the characterized memory.

In one variant, the operating the characterized memory for the error-tolerant application in accordance with the first operating parameter includes powering the characterized memory at a reduced power.

In one variant, the method further includes monitoring a performance of the error-tolerant application. In one such variant, the method further includes updating the one or more data that identify the first performance and the first operating parameter based on the monitored performance of the error-tolerant application.

In one variant, the reading the one or more data that identify the first performance and the first operating parameter of a characterized memory further includes: reading a plurality of data that identify a plurality of performances associated with a plurality of operating parameters of the characterized memory; and selecting the first performance and the first operating parameter of the characterized memory based on the error-tolerance threshold.

In one aspect, an apparatus is disclosed. In one embodiment, the apparatus includes: a characterized memory; a processor; and a non-transitory computer readable medium. In one exemplary embodiment, the non-transitory computer readable medium includes one or more instructions that when executed by the processor cause the processor to: read one or more data stored within the characterized memory that identify a first performance and a first operating parameter of the characterized memory; determine whether the first performance is acceptable for at least one application; and when the first performance is acceptable for the at least one application, operating the characterized memory for the at least one application in accordance with the first operating parameter.

In one variant, the apparatus includes a clock circuit configured to clock the characterized memory in accordance with the first operating parameter. In one such variant, the clock circuit is further configured to clock the characterized memory in accordance with a specified clock rate when the first performance is unacceptable for the at least one application.

In one variant, the apparatus includes a power circuit configured to power the characterized memory in accordance with the first operating parameter. In one such variant, the power circuit is further configured to power the characterized memory in accordance with a normal power when the first performance is unacceptable for the at least one application.

In another aspect, a method for monitoring a performance of characterized memories is disclosed. In one embodiment, the method includes: accessing contents of a characterized memory at a characterized rate with a processor, wherein the characterized memory has one or more uncorrectable faults; where the characterized memory is characterized by a target performance based on the one or more uncorrectable faults; determining an actual performance with the processor, based on the accessed contents and a pristine copy of the contents; and refreshing the contents of the characterized memory with the processor when the actual performance exceeds the target performance by a bound amount.

In one variant, refreshing the contents of the characterized memory includes re-writing the contents of the characterized memory with the pristine copy of the contents.

In one variant, the actual performance is based on monitoring an increase in uncorrectable faults attributed to probabilistic errors.

In one variant, accessing the contents of the characterized memory includes a plurality of uniformly distributed memory reads over a memory space.

In another variant, the actual performance includes a bit error rate (BER).

In another variant, the method further includes: re-characterizing the characterized memory with a new target performance when the actual performance exceeds the target performance by the bound amount.

In one aspect, a method for estimating a degradation of one or more characterized memories is disclosed. In one embodiment, the method includes: accessing contents of a characterized memory at a characterized rate with a processor; wherein the characterized memory is characterized by a target performance; determining an actual performance with the processor based on the accessed contents and a pristine copy of the contents; and when the determined actual performance exceeds the target performance by a bound amount, triggering a remediation process.

In one variant, the method further includes identifying uncorrectable faults. In one such variant, the remediation process includes causing a replacement of the characterized memory when the identified uncorrectable faults exceeds a threshold amount. In another such variant, the remediation process includes refreshing the contents of the characterized memory when the identified uncorrectable faults do not exceed a threshold amount.

In one aspect, an apparatus configured to remedy faults in one or more characterized memories is disclosed. In one embodiment, the apparatus includes: a characterized memory including one or more uncorrectable faults; wherein the characterized memory accumulates one or more correctable faults probabilistically during use; a processor configured to access the characterized memory at a characteristic rate; controller logic configured to determine a performance metric based on the one or more uncorrectable faults and the one or more correctable faults; wherein the controller logic is configured to refresh the characterized memory when a number of correctable faults exceed a threshold; and wherein the controller logic is configured to flag the characterized memory for replacement when a number of uncorrectable faults exceed a threshold.

In another aspect of the disclosure, a computerized wireless access node apparatus configured to dynamically access a characterized memory is disclosed. In one embodiment, the computerized wireless access node includes: a wireless interface configured to transmit and receive RF waveforms in the spectrum portion; digital processor apparatus in data communication with the wireless interface; and a characterized memory in data communication with the digital processor apparatus and including at least one computer program.

In an additional aspect of the disclosure, computer readable apparatus is described. In one embodiment, the apparatus includes a storage medium configured to store one or more computer programs within or in conjunction with characterized memory. In one embodiment, the apparatus includes a program memory or HDD or SDD on a computerized controller device. In another embodiment, the apparatus includes a program memory, HDD or SSD on a computerized access node.

These and other aspects shall become apparent when considered in light of the disclosure provided herein.

Figure 1A:
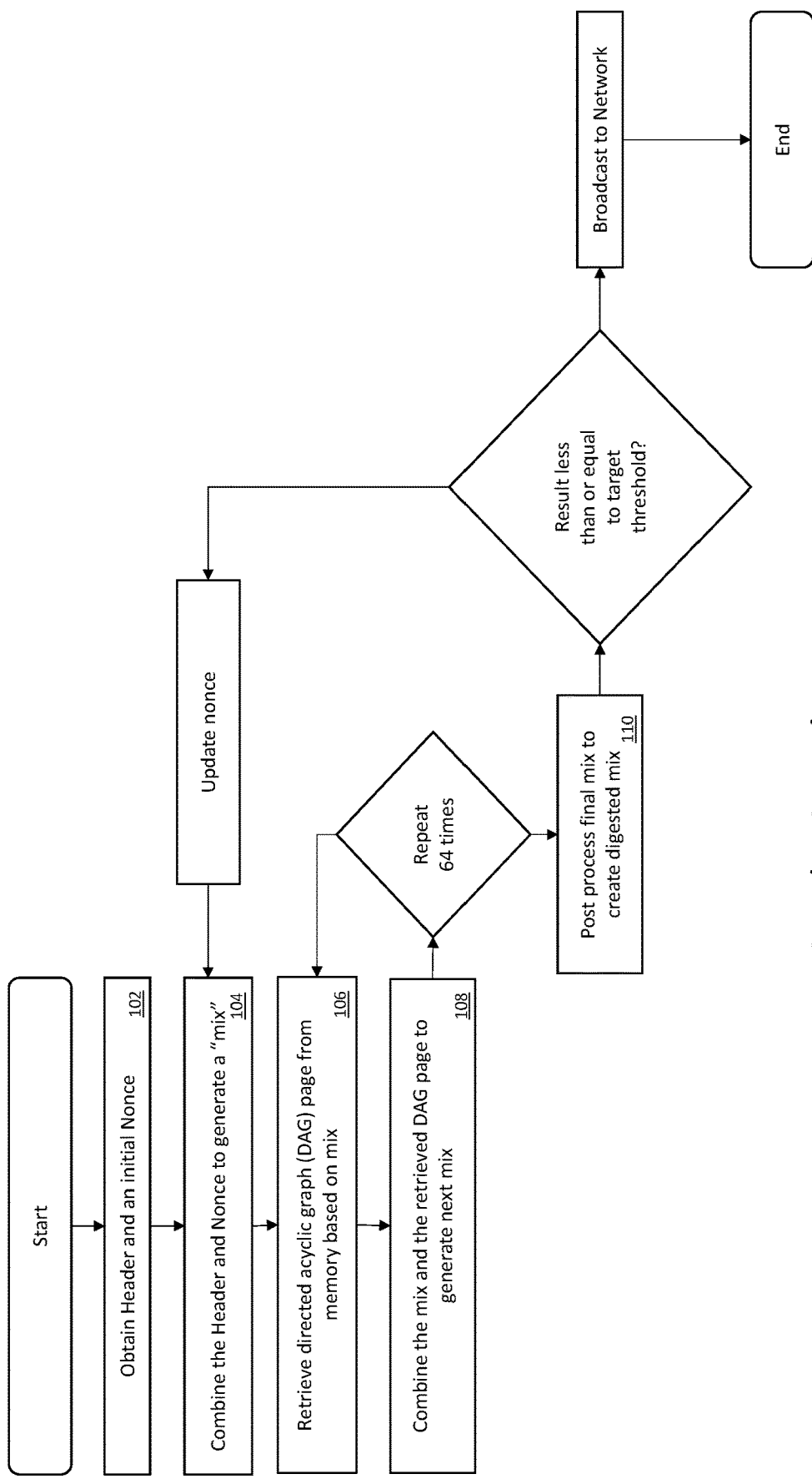
FIG. 1A is a graphical illustration of a prior art Ethash algorithm.

All figures © Copyright 2018-2019 Micron Technology, Inc. All rights reserved.

DETAILED DESCRIPTION

Reference is now made to the drawings wherein like numerals refer to like parts throughout.

As used herein, the term "access node" refers generally and without limitation to a network node which enables communication between a user or client device and another entity within a network, such as for example a 5G NR gNB, an LTE eNB, a Wi-Fi AP, or a Wi-Fi-Direct enabled client or other device acting as a Group Owner (GO).

As used herein, the term "application" (or "app") refers generally and without limitation to a unit of executable software that implements a certain functionality or theme. The themes of applications vary broadly across any number of disciplines and functions (such as cryptocurrency mining, on-demand content management, e-commerce transactions, brokerage transactions, home entertainment, etc.), and an application may have more than one theme. The unit of executable software generally runs in a predetermined environment; for example, a processor architecture may retrieve and execute instructions from a non-transitory computer-readable storage medium where the instructions are compiled for the processor architecture.

As used herein, the terms "client device" or "user device" or "UE" may include, but are not limited to, mobile devices such as handheld computers, PDAs, personal media devices (PMDs), tablets, "phablets", smartphones, and vehicle infotainment systems or portions thereof, as well as set-top boxes (e.g., DSTBs), gateways, modems, personal computers (PCs), and minicomputers, whether desktop, laptop, or otherwise.

As used herein, the term "computer program" or "software" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.), Register Transfer Language (RTL), VHSIC (Very High Speed Integrated Circuit) Hardware Description Language (VHDL), Verilog, and the like.

As used herein, the terms "Internet" and "internet" are used interchangeably to refer to inter-networks including, without limitation, the Internet. Other common examples include but are not limited to: a network of external servers, "cloud" entities or "fog" networks (such as memory or storage not local to a device, storage generally accessible at any time via a network connection, and the like), service nodes, access points, controller devices, client devices, etc.

As used herein, the terms "5G NR, "5G," and "New Radio" refer without limitation to 3GPP Release 15 and TS 38.XXX Series and subsequent or related standards.

As used herein, the term "memory" includes any type of integrated circuit or other storage device adapted for storing digital data including, without limitation, random access memory (RAM), pseudostatic RAM (PSRAM), dynamic RAM (DRAM), synchronous dynamic RAM (SDRAM) including double data rate (DDR) class memory and graphics DDR (GDDR) and variants thereof, ferroelectric RAM (FeRAM), magnetic RAM (MRAM), resistive RAM (RRAM), read-only memory (ROM), programmable ROM (PROM), electrically erasable PROM (EEPROM or EPROM), DDR/2 SDRAM, EDO/FPMS, reduced-latency DRAM (RLDRAM), static RAM (SRAM), "flash" memory (e.g., NAND/NOR), phase change memory (PCM), 3-dimensional cross-point memory (3D Xpoint), and magnetoresistive RAM (MRAM), such as spin torque transfer RAM (STT RAM).

As used herein, the terms "microprocessor" and "processor" or "digital processor" are meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable computer fabrics (RCFs), array processors, graphics processors (e.g., GPUs), secure microprocessors, and application-specific integrated circuits (ASICs). Such digital processors may be contained on a single unitary IC die, or distributed across multiple components.

As used herein, the terms "network" and "bearer network" refer generally to any type of telecommunications or data network including, without limitation, hybrid fiber coax (HFC) networks, satellite networks, telco networks, and data networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, ATM, X.25, Frame Relay, 3GPP, 3GPP2, LTE/LTE-A/LTE-U/LTE-LAA, WAP, SIP, UDP, FTP, RTP/RTCP, H.323, etc.).

As used herein, the term "network interface" refers to any signal or data interface with a component or network including, without limitation, those of the FireWire (e.g., FW400, FW800, etc.), USB (e.g., USB 2.0, 3.0. OTG), Ethernet (e.g., 10/100, 10/100/1000 (Gigabit Ethernet), 10-Gig-E, etc.), MoCA, Coaxsys (e.g., TVnet™), radio frequency tuner (e.g., in-band or OOB, cable modem, etc.), LTE/LTE-A/LTE-U/LTE-LAA, Wi-Fi (802.11), WiMAX (802.16), Z-wave, PAN (e.g., 802.15), or power line carrier (PLC) families.

As used herein, the term "server" refers to any computerized component, system or entity regardless of form which is adapted to provide data, files, applications, content, or other services to one or more other devices or entities on a computer network.

As used herein, the term "storage" refers to without limitation computer hard drives, DVR device, memory, RAID devices or arrays, optical media (e.g., CD-ROMs, Laserdiscs, Blu-Ray, etc.), or any other devices or media capable of storing content or other information.

As used herein, the term "wireless" means any wireless signal, data, communication, or other interface including without limitation Wi-Fi, Bluetooth/BLE, 3G (3GPP/3GPP2), HSDPA/HSUPA, TDMA, CBRS, CDMA (e.g., IS-95A, WCDMA, etc.), FHSS, DSSS, GSM, PAN/802.15, WiMAX (802.16), 802.20, Zigbee®, Z-wave, narrowband/FDMA, OFDM, PCS/DCS, LTE/LTE-A/LTE-U/LTE-LAA, analog cellular, CDPD, satellite systems, millimeter wave or microwave systems, acoustic, and infrared (i.e., IrDA).

As used herein, the term "class," within the context of memory, refers to memories which may exceed yet minimally perform according to a specific requirement. For example, current "general compute" memories are termed "first-class" memories that guarantee a maximum bit error rate (BER) of e.g., $1 \times 10^{-18}$ under standardized operating conditions (e.g., room temperature, voltage, current, humidity, etc.), whereas "second-class" memories can include memories with a maximum BER of $1 \times 10^{-5}$ under the same standardized operating conditions. Notably, memories may perform at significantly better or worse BER under other environments; for example, a second class memory may provide better than $1 \times 10^{-18}$ BER under ideal conditions, and similarly a first class memory may perform worse than $1 \times 10^{-5}$ BER under harsh conditions.

The foregoing terms of first class and second class are purely used as relative measures of performance under a fixed set of conditions for consumer applications, and are purely arbitrary. Other classification schemes (e.g., military specifications) may classify memories under different characteristics and/or with other levels of gradation. For example, memories may be classified according to environmental tolerances (high temperatures/humidity, low temperatures/humidity), performance ranges (e.g., different speed grades), and/or any other operational parameter. Various other classification schemes will be readily appreciated by those of ordinary skill given the contents of the present disclosure.

Overview

Currently, memory hard cryptocurrency mining is done with "general compute" memories. Given the explosion of consumer interest in cryptocurrencies, there is a substantial economic incentive to field more mining hardware, as well as develop faster, more efficient mining hardware. One proposed technique for increasing "memory hard" mining hardware (i.e., for mining algorithms that require large amounts of memory to run to support applications in which memory bandwidth is used as a POW) in a cost effective manner would be to use memories that are less reliable than general compute memories; however, unreliable memories may output an excessive number of invalid proof-of-work (POW) solutions that could result in undesirable consequences (banning, kicking, etc.).

The traditional or "general compute" memory paradigm attempts to avoid errors with e.g., expensive manufacturing tolerances (e.g., very low bit error rates (BER). However, many areas of modern computing have explored error-tolerant techniques. Error-tolerant computing (also sometimes referred to as "error-resilient") refers to computing which assumes and allows for the presence of some noise and/or errors in memory and/or data. There are many applications for probabilistic computing, stochastic computing, and/or other types of error-tolerant computing.

To these ends, techniques for validating proof-of-work (POW) memory search results for e.g., memory hard cryptocurrencies are desired. More generally, error-tolerant memory searches with unreliable memory devices may enable faster, more efficient, and/or cost-effective solutions compared to existing general compute memory techniques. Error-tolerant memory searching may have broad applicability to a range of probabilistic or stochastic computing applications, machine learning, cryptography, and/or any number of other error-tolerant applications.

The present disclosure describes, inter alia, techniques and apparatus for using characterized memory to enable faster, more efficient, cost-effective memory searches compared to existing general compute memory searches. Some embodiments described herein can be used without validation in error-tolerant or stochastic computing systems; e.g., systems that assume the presence of some noise and/or errors in memory and/or data.

As a related variation, memory devices may be selected from many different classes of memory based on the degree of error-tolerance or stochasticity of a system. In other variants, memory devices that have been characterized with an error rate performance over a range of one or more parameters (rather than a class based categorization) may be selected for use based on the degree of error-tolerance or stochasticity of a system. Various other combinations and permutations of the foregoing are explored in greater detail hereafter.

Some embodiments described herein implement a validation stage so as to catch and remove memory errors before the memory search result is returned. In one exemplary embodiment, improved methods and apparatus for validating memory search results from a "pool" of characterized memories with a validation memory are described. The validation stage can ensure a minimum level of performance for the pool of characterized memories.

In one exemplary embodiment, a pool of characterized memories can return memory search results for memory hard proof-of-work (POW) solutions used in cryptocurrency mining e.g., Ethereum mining. Advantageously, the exemplary embodiment described herein can leverage less expensive, defective, or otherwise unmarketable memory that has been characterized with an error rate performance over a range of one or more parameters. Such characterized memories can expand and parallelize memory searching in cryptocurrency mining in a cost efficient manner. In some such variants, the use of a validation stage can further ensure that invalid mining results are not returned to the community of miners in the cryptocurrency network; in this way, a mining node will not be penalized for using memories that have a different characteristic than general compute memory (e.g., the mining node will not be kicked or banned).

Although the present disclosure uses cryptocurrency mining to illustrate the various techniques described herein, those of ordinary skill in the related arts given the contents of the present disclosure will readily appreciate that the techniques described herein may be used for a variety of other applications. For example, the techniques described herein may be used in machine learning, artificial intelligence, cloud and/or fog based computing, and any application that involves and/or accounts for probabilistic errors, noise and/or other sources of stochasticity.

As described in greater detail hereinafter, memory devices may be tiered into many different tiers of class based on their uncorrectable fault performance. In particular, so-called "correctable" faults can be corrected with e.g., repair and/or error correcting codes (ECC). However, "uncorrectable" faults cannot be corrected due to e.g., exhaustion of repair resources and/or limitations of ECC capability. In one such variant, memories with uncorrectable faults may be validated (with a validation stage); such techniques may enable cost efficient reuse of memories that otherwise might be unmarketable and/or thrown away.

Furthermore, schemes for categorizing memory faults into probabilistic errors in memory technology due to stochastic sources, and hardware failures due to physical defects, are disclosed. Various methods and apparatus are described which, inter alia, monitor the degradation of memory performance to provide a continuous in-use performance characterization. Degradation of memory performance attributed to stochastic errors and not physical defects can be used to intelligently refresh the characterized memory more or less frequently to optimize performance and/or productive life. Degradation of memory performance attributed to uncorrectable faults due to accumulating physical defects can be used to trigger hardware replacement. The various described techniques ensure proper performance (e.g., error rate) and/or efficiency of the characterized memory.

Detailed Description of Exemplary Embodiments

Exemplary embodiments of the present disclosure are now described in detail. While these exemplary embodiments are described in the context of the previously mentioned memory-bound (or memory hard), proof-of-work (POW)-based cryptocurrency mining utilizing a blockchain (e.g., Ethereum mining), the general principles and advantages of the disclosure may be extended to other types of systems involving sequential transactional databases, cryptocurrencies, networks, architectures, and mechanisms, any of which are configured to provide a distributed chain of blocks or transaction data structures accessed by a network of nodes (also referred to as a network of miners, in some instances).

As of the filing date of the present disclosure, Ethereum (and the cryptocurrency Ether) uses the proof-of-work (POW) algorithm "Ethash"; however, there is some interest in modifying Ethereum for a proof-of-stake algorithm (e.g., where the network is secured by proof of ownership of tokens, rather than a proof of work). Accordingly, while the exemplary embodiments of the present disclosure are described in the context of memory hard POW, the present disclosure contemplates leveraging other forms of POW as well as other proof-of schemes (including proof-of-stake, proof-of-authority, proof-of-space, etc.). The architectures, systems, apparatus, and methods described herein can be utilized in any application involving error-tolerance, noise, probability, and/or stochasticity. For example, the present disclosure can apply to various probabilistic or machine learning fields such as DNA sequencing, retail inventory, disease prediction, pattern recognition, and/or any other large scale pattern recognition. More generally, as described in greater detail hereinafter, an "efficiency curve" (or set of curves) can be used to characterize solution density as a function of noise/errors. The efficiency curve can be used to tradeoff requirements necessary to accomplish a desired performance, with other parameters (e.g., component cost, component quality, etc.). Such information can be used to intelligently select and/or reuse a variety of characterized memory devices (rather than "general compute" memories).

Other features and advantages of the present disclosure will immediately be recognized by persons of ordinary skill in the art with reference to the attached drawings and detailed description of exemplary embodiments as given below.

Exemplary Ethereum and Ethash Operation

As previously noted, Ethereum is one exemplary blockchain-based distributed computing platform and operating system. Ethereum networks create and transact Ether as a cryptocurrency. FIG. 1A is a logical flow diagram of an existing method for proof-of-work (POW) mining with the Ethash algorithm useful for demonstrating memory hardness in the context of Ethereum.

At step 102, the miner generates a short binary blob (binary large object) "nonce"; a nonce is data that is only used once (e.g., to avoid playback type attacks). Within the context of Ethash, the nonce serves as an input to a mixing process and algorithm. The miner combines the nonce with unique header metadata (including timestamp and software version) derived from the latest block of the blockchain. A SHA3-like (Secure Hash Algorithm 3) algorithm is used to combine the pre-process header and nonce to create an initial 128 byte "mix" (step 104).

At step 106, the 128 byte mix is used to identify a 128 byte page to retrieve from memory based on an Ethash specific directed acyclic graph (DAG). As a brief aside, a DAG provides a pseudorandom memory data set that is computationally straightforward to generate. The DAG dataset is generated as a linear function of the blockchain length, and is regenerated every 30,000 blocks (a so-called "epoch"). As of the present disclosure, the DAG was approximately 4GB, and the DAG will continue grow in size as the blockchain grows. Retrieving memory pages from the DAG stored in memory is physically constrained by memory bandwidth; thus, the periodically changing Ethereum DAG provides a source of memory hardness for Ethereum.

Referring back to FIG. 1A, once the 128 byte page is retrieved from the DAG, it is combined with the initial 128 byte mix, yielding a new mix (step 108). The new mix is then utilized to identify another DAG page to retrieve. Once that new DAG page is retrieved, it is combined with the new mix to generate yet another mix. This process is performed 64 times. After the $64^{th}$ time of mixing, the resulting 128 byte mix is then post-processed to generate a shorter, 32 byte digested mix (step 110).

After the mixing function and post-processing, the 32 byte digested mix is compared against a predefined 32 byte target threshold. If the 32 byte digested mix is less than or equal to predefined 32 byte target threshold, then the current nonce is considered valid, and can be broadcast with the header as a POW to the Ethereum network. If the target threshold is not met, the current nonce is considered invalid, and the algorithm is re-run with a different nonce (either by incrementing the current nonce, or picking a new one at random).

While not expressly shown in FIG. 1A, it should be emphasized that searching for a nonce and header combination that will result in a digested mix that satisfies the target threshold may require many attempts; in other words, searching for a valid nonce requires a substantial amount of physical entropy in the form of memory bandwidth. However, once a nonce is successfully found, any peer entity can straightforwardly verify that the nonce indeed results in a value that satisfies the target threshold by checking that the header/nonce combination and DAG lookups to generate the digested mix. Moreover, since each header and nonce combination can only be used once, the Ethash algorithm ensures that only new nonce searches can be added to the blockchain.

Figure 1B:
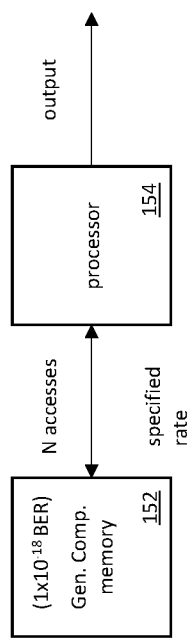
FIG. 1B is a logical block diagram of a prior art apparatus configured to search for proof-of-work (POW) with the Ethash algorithm of FIG. 1A.

FIG. 1B is a logical block diagram of an existing apparatus configured to search for proof-of-work (POW) with the aforementioned Ethash algorithm of FIG. 1A. As shown in FIG. 1B, the system includes a general compute memory 152 and a processor 154. The general compute memory 152 is "specified" for an identified performance under standardized conditions (e.g., a RAM provides 3.6 Gb/s at $1 \times 10^{-18}$ BER, at a particular voltage, temperature, humidity, etc.). The general compute memory 152 stores the Ethash specific directed acyclic graph (DAG) and each iteration of the Ethash algorithm requires 64 accesses to generate a digested mix. Since the vast majority of header/nonce combinations will not satisfy the target threshold, the apparatus is likely to consume a significant amount of memory bandwidth for each attempt.

Figure 1C:
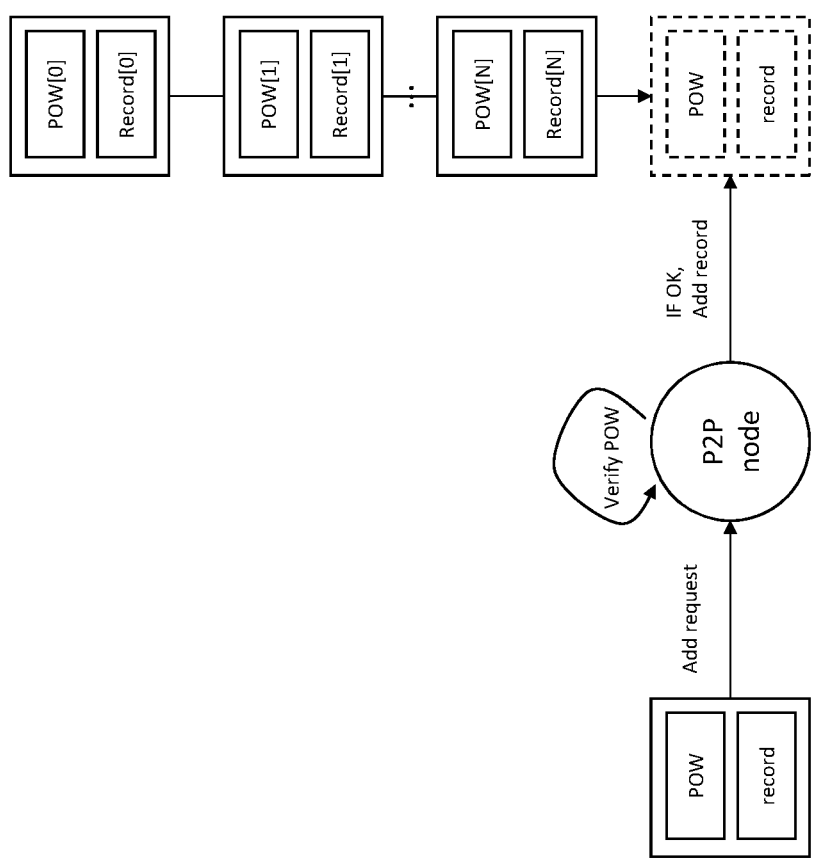
FIG. 1C is a graphical illustration of a prior art process by which proof-of-work (POW) that is generated by an Ethereum miner can be used in the context of the blockchain-based shared ledger.

FIG. 1C illustrates the process by which proof-of-work (POW) that is generated by an Ethereum miner can be used in the context of the blockchain-based shared ledger.

Each transactional block includes data representing each transaction (e.g., a POW and record). The record typically includes unique header metadata (including timestamp and software version) derived from the latest block.

A proposed transaction (including a generated POW and a record) is broadcast to the network and validated by peers; for clarity, only a single P2P peer is shown in FIG. 1C.

Specifically, the P2P peer receives a block that is proposed to be added to the blockchain. If the POW is successfully verified by the P2P peer node, then the proposed block can be added to the blockchain. In some cases, the miner may also receive a reward in the form of the digital currency (e.g., Ether).

As previously alluded to, cryptocurrency mining is designed to account for malicious parties and fake POW. Transactions added erroneously or maliciously will not be verified by other miners in the network and will not persist in the blockchain. Furthermore, the Ethereum network penalizes malicious behavior. Specifically, the node or IP address associated with a misbehaving miner can experience undesirable consequences, like being banned or temporarily kicked from the network.

Figure 1D:
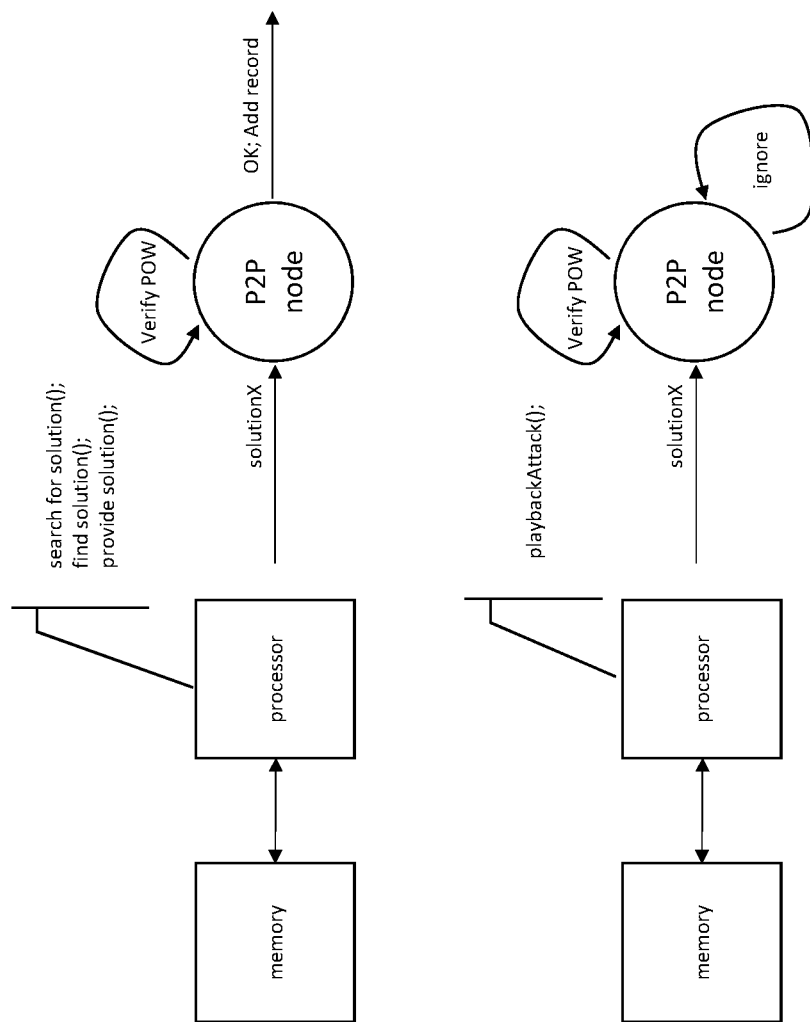
FIG. 1D is a graphical illustration of a prior art process by which proof-of-work (POW) that is generated by an Ethereum miner cannot be used multiple times in the context of the blockchain-based shared ledger.

For example, as shown in FIG. 1D, a solution (header/nonce combination) can only be used once. If the same solution is repeated (e.g., in a playback type attack), then the P2P node will reject the new solution. Since the DAG is shared by all of the Ethereum miners and the DAG is regenerated at 30,000 blocks, there are 30,000 unique solutions that the miners of the Ethereum mining community are in a race to find. More directly, a miners' profitability depends on their ability to generate valid header/nonce combinations and the amount of computing power they devote to the process in outputting valid blocks before other miners.

Figure 1E:
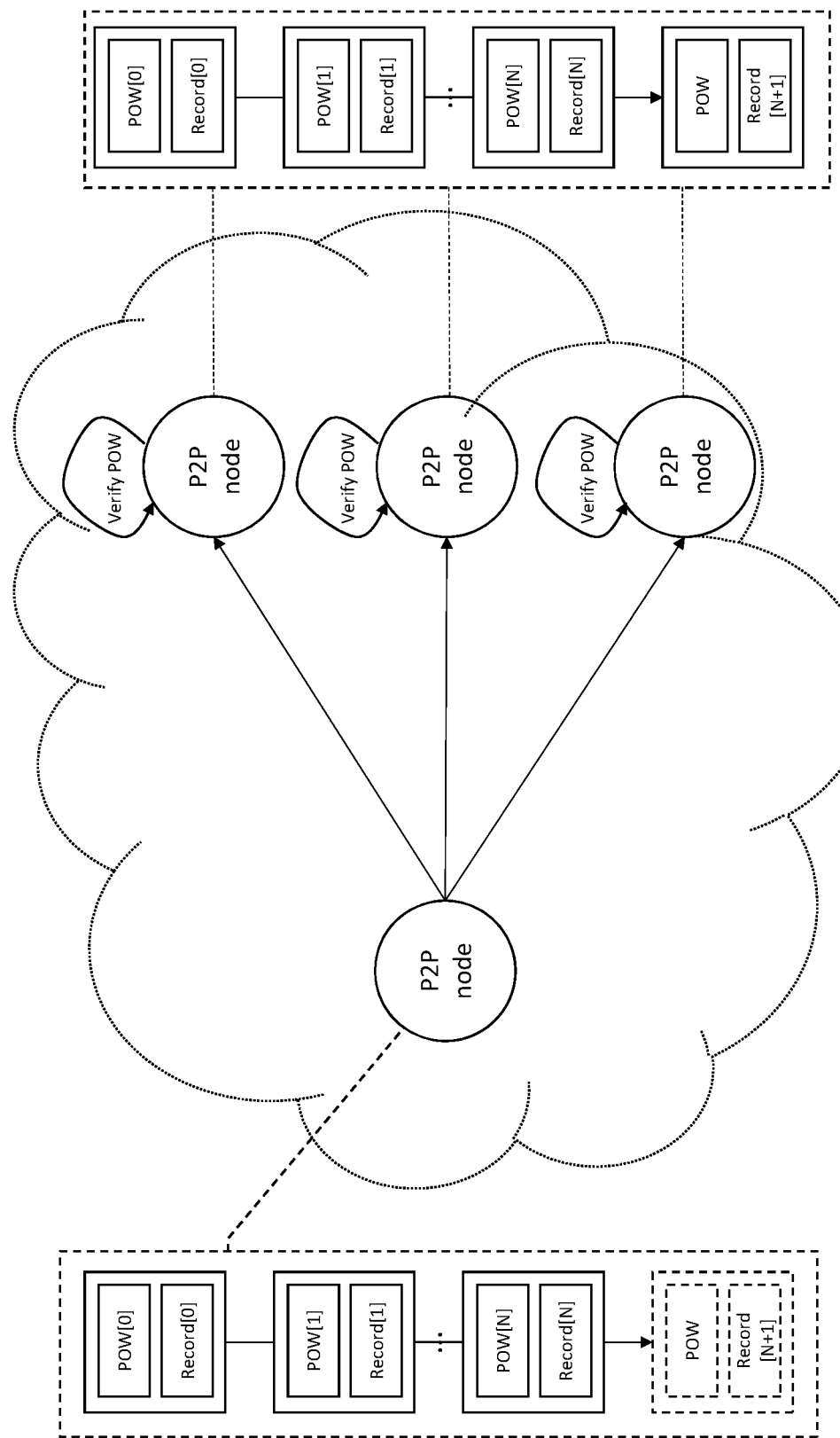
FIG. 1E is a graphical illustration of a prior art process by which proof-of-work (POW) that is verified by a community of miners can be added to the blockchain-based shared ledger.

Furthermore, the shared ledger nature of the Ethereum blockchain also ensures that each of the peer mining nodes of the Ethereum community cannot falsify a record. As shown in FIG. 1E, when a peer node successfully adds another block to the blockchain, the proposed blockchain is provided to each of the other peer nodes. Only when a majority of the peer nodes of the community have reached consensus that the proposed addition is legitimate does the proposed ledger become the shared ledger. If the peer network does not reach consensus, then the proposed ledger is ignored. When the shared ledger successfully adds another block, then the miners will stop work on the current block and start on the next block.

As a related corollary, the fact that a blockchain accumulates entropy means that the rate at which entropy is being added to a community is a "proof of cooperation" without any central organizer. Specifically, one computer is only capable of adding a certain amount of entropy, but a million computers working together generate entropy additively (a Poisson process). In other words, the largest pool of entropy is considered the valid state of the network (the consensus of the community), and the largest pool of entropy can only be generated by the network as a whole; it cannot be generated by a single attacker or even a subset of the pool. Thus, the ability to measure consensus or cooperation is as simple as validating the amount of entropy of the system.

More generally, artisans of ordinary skill in the related arts will appreciate that cryptocurrencies (like Ethereum) that are based on a community of untrusted parties which cooperate to share a public ledger must implement barriers to malicious activity and/or penalize malicious behaviors. The combined results of infeasibility of attack, expense to attack, and the likelihood of penalty for a failed attack provide strong disincentive for malicious behavior within cryptocurrency networks; in this manner, cryptocurrency networks are able to ensure that the shared ledger can be trusted, without vesting trust in any single party.

Defining an Efficiency Curve for Ethereum Solutions

As noted above, Ethereum mining is error intolerant because the network paradigm is focused on eliminating malicious activity within a community of untrusted peers. However, there is no technical distinction between a malicious fault and a hardware fault; more directly, both malicious faults and hardware faults result in incorrect data.

Conventional wisdom would suggest that the difficulty of finding a valid header/nonce solution and the penalties assessed for invalid solutions favor careful and thorough memory searching. Consequently, Ethereum mining is currently implemented within general compute memories; so-called general compute memories impose a very high manufacturing tolerance (e.g., $1 \times 10^{-18}$ BER). By using general compute memories, an Ethereum miner is assured that they will not waste resources generating false positives (i.e., invalid solutions) and/or miss valid solutions (i.e., a false negative) in the predefined space.

Consider a system where Ethereum mining is performed by nodes that trust one another (i.e., no malicious activity). Under such a scenario, errors may be attributed to hardware faults rather than malicious activity and would not be penalized. Instead, hardware faults can be handled with a variety of error-tolerant techniques. For example, hardware systems may use error-tolerant techniques such as self-monitoring, analysis, and reporting technologies (SMART). Additionally, memories could be used under conditions that exceed normal operating parameters (e.g., over clocked for faster searching) and/or unreliable memories could be used at much lower cost.

Conceptually, using error-tolerant systems to perform proof-of-work (POW) searching may seem to provide advantages over traditional general compute memory alternatives. However, the amount of error-tolerance that is acceptable may be characterized in order to ensure that the benefits outweigh the possible inefficiencies caused by false positives and/or missed solutions.

A generalized mathematical representation to express solution error rate (SER) (also referred to as "false positives") as a function of corrected bit error rate (BER) is given by:

$$SER = 1 - (1 - BER)^M \quad \text{EQN 1}$$

Where:
BER is the bit error rate of the memory (after ECC correction); and
M is the size of the solution (in bits).

Figure 2A:
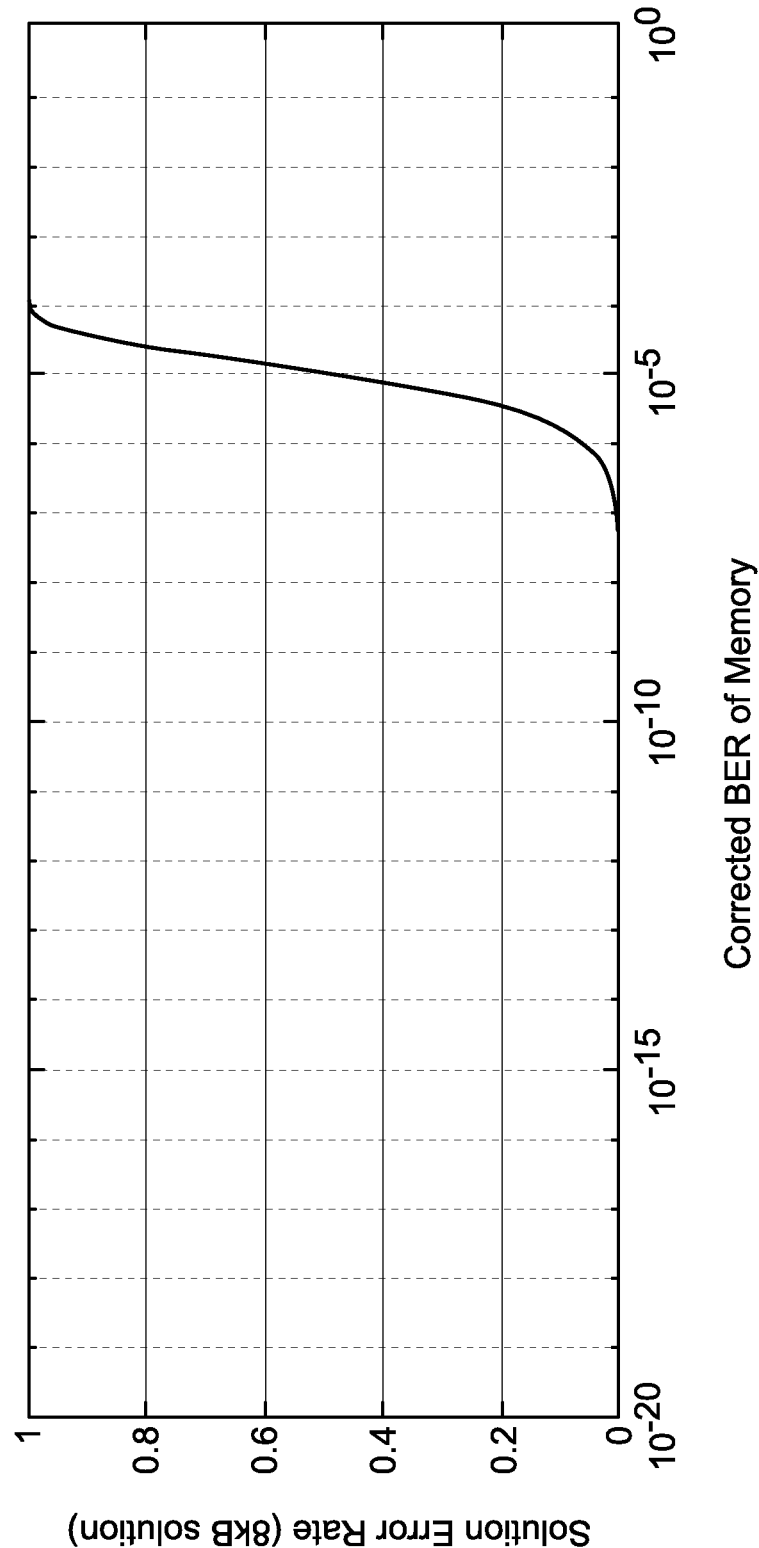
FIGS. 2A-2C are graphical representations of corrected Bit Error Rate (BER), useful to calculate a system efficiency, in accordance with the various principles described herein.

FIG. 2A graphs an exemplary SER as a function of the corrected BER of memory, using parameters that model Ethash for Ethereum (e.g., M=64*128 B (a 8 KB solution)).

Some valid solutions are also lost due to BER. However, the solution loss rate (SLR) ("false negatives") only occurs once a valid solution is found but an error prevents its correct identification. Very rarely, some errors that should cause invalid solutions may also achieve a "lucky" outcome and be valid. In other words, a false negative is the combination of: (i) the error free condition $(1-BER)^M$ and (ii) a lucky error that causes the solution density function (SDF)) to be serendipitously corrupted $(1-(1-BER)^M)$. Thus, a generalized mathematical representation to express solution loss rate (SLR) as a function of corrected bit error rate (BER) is given by the combination of the two foregoing scenarios (i) and (ii):

$$SLR = 1 - ((1-BER)^M + SFD*(1-(1-BER)^M)) \quad \text{EQN 2}$$

Where:
BER is the bit error rate of the memory (after ECC correction);
M is the size of the solution (in bits); and
SFD is the solution density function.

Figure 2B:
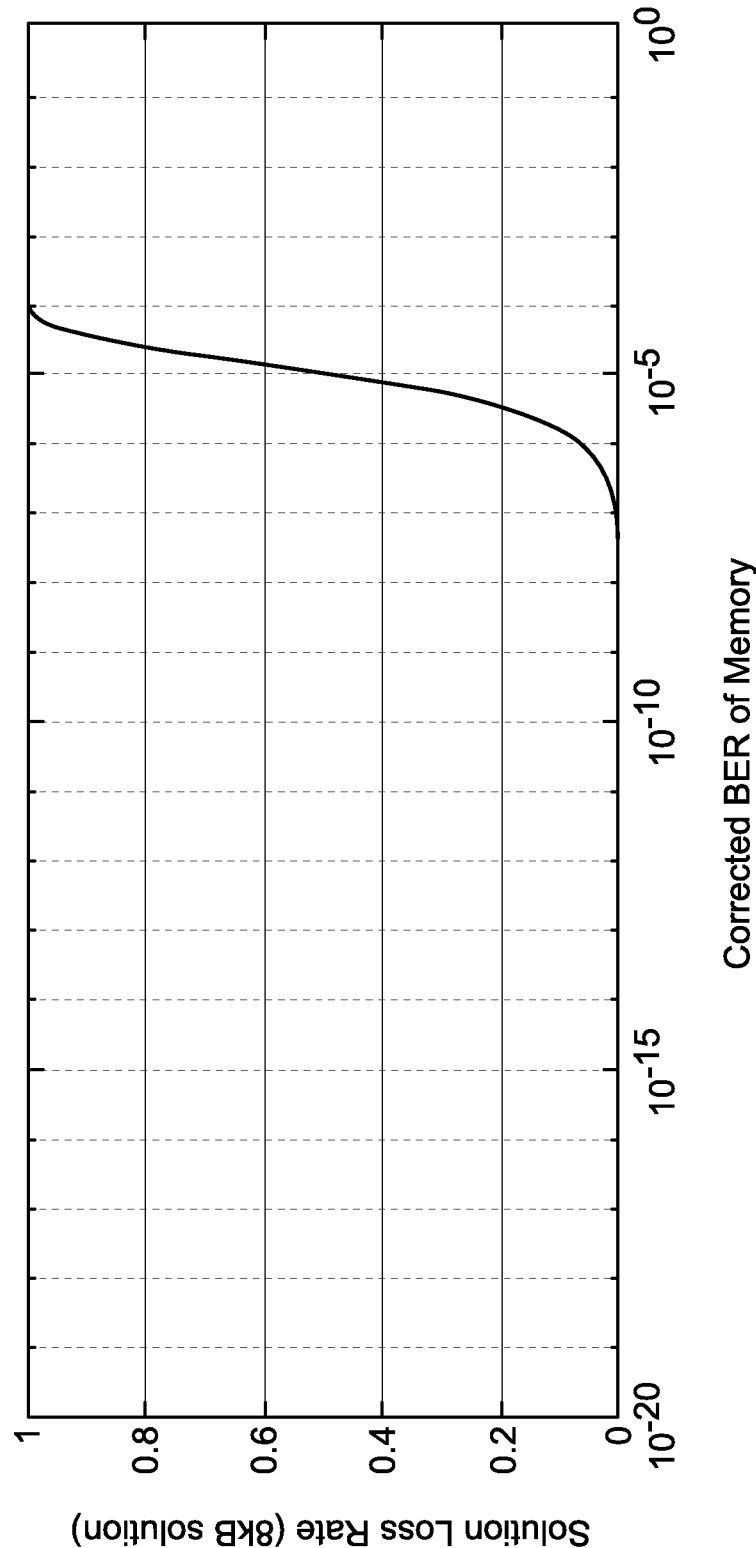

FIG. 2B graphs an exemplary SLR as a function of the corrected BER of memory, using parameters that model Ethash for Ethereum (e.g., for M=64*128 B (a 8 KB solution) and SFD=1/1515456000). Here, the SFD represents a "difficulty" ratio of valid solutions to total search space for Ethash.

The system efficiency can be determined as a function of false positives and false negatives; system efficiency provides a relative measure to prior art systems (which are assumed to have a 100% efficiency (1)). A generalized mathematical representation based on the two foregoing equations EQN 1 and EQN 2 is provided herein:

$$\text{System Efficiency} = ((1-BER)^M + SFD*(1-(1-BER)^M)) - 1 \quad \text{EQN 3}$$

Where:
BER is the bit error rate of the memory (after ECC correction);
M is the size of the solution (in bits); and
SFD is the solution density function.

Figure 2C:
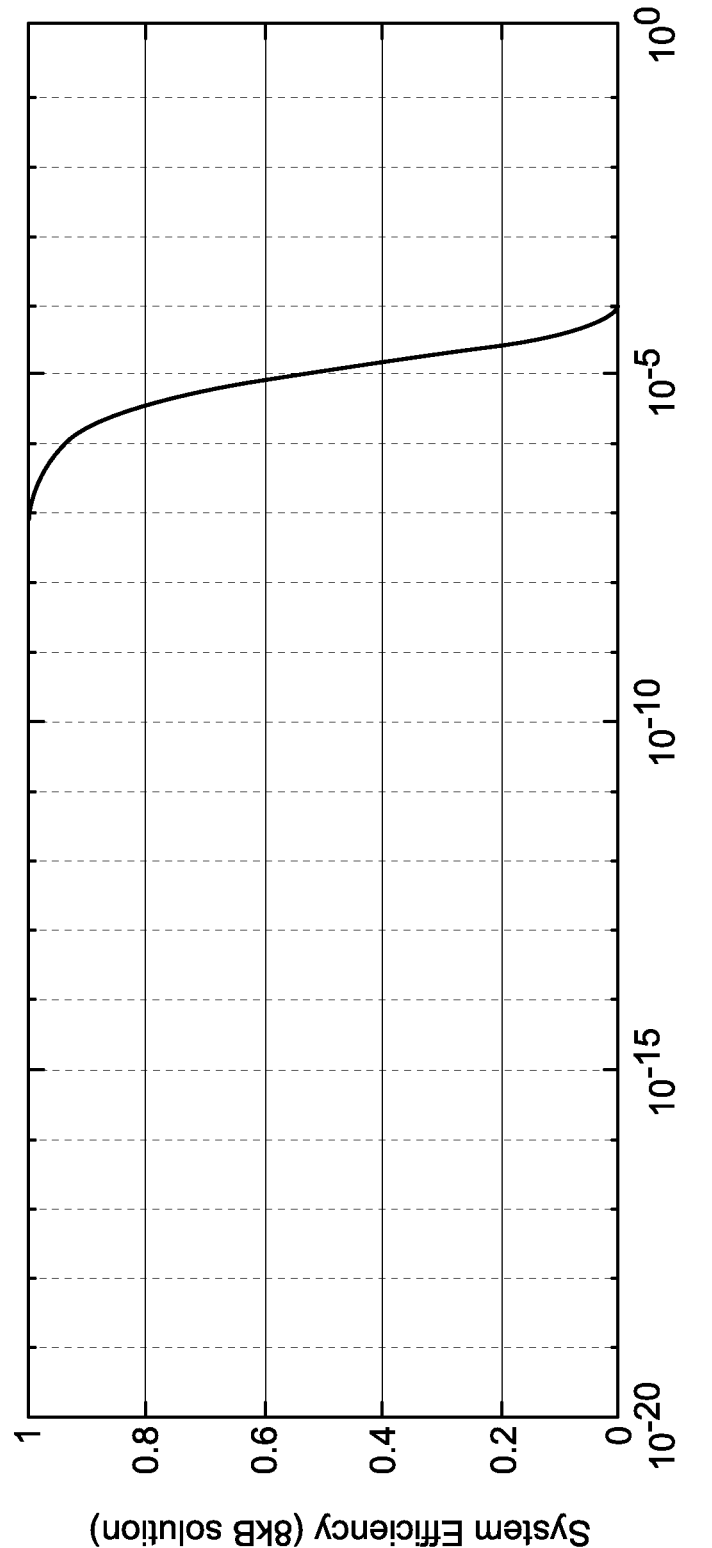

FIG. 2C graphs an exemplary system efficiency as a function of the corrected BER of memory, based on the Ethash parameters. As shown therein, even memories with very high error rates can provide Ethash proof-of-work (POW) that is almost as efficient as general compute memory over a very broad range of BER performance. More directly, FIG. 2C demonstrates that error-tolerant techniques can be successfully used in Ethereum mining.

Artisans of ordinary skill in the related arts will readily appreciate that although the efficiency curve of FIG. 2C shows an exemplary Ethereum POW system efficiency curve as a function of corrected BER performance, the Ethereum POW mining application is merely exemplary in nature. Any application could be analyzed in the same manner to generate an efficiency curve. Furthermore, the "corrected BER" analysis is conservative. Most memories (such as DRAM) include internal error-correcting code (ECC) logic that provides a "corrected BER" with substantially better performance than the raw BER of the DRAM. The corrected BER of the forgoing discussion is a BER after ECC, but does not account for the effects of other error correcting logic that may be external to the memory.

Example Operation #1, Characterized Memory

One inference that can be made in view of the efficiency curve for Ethereum POW mining of FIG. 2C, is that the solution density is very "sparse". As used in the present context, the term "sparse" refers to a solution space that is very thinly populated with solutions. In other words, the vast number of attempted header/nonce combinations are not valid solutions; in fact, the sparsity of the Ethash algorithm is an intentional property of proof-of-work algorithms. More directly, as specifically noted above, the probability that a valid solution is miscalculated and passes due to luck is insignificant. However, in a related corollary, the probability that an invalid solution is miscalculated and believed to be valid (i.e., a false positive) may be more common, however sufficiently rare as to offset other considerations (such as cost or speed).

More directly, conventional wisdom has held that mining with unreliable memory is not desirable, as it will likely result in broadcasting invalid POW solutions, thereby wasting resources (e.g., time and power), and perhaps being banned from the network. However, the foregoing analysis shows that some level of invalid POW may be tolerable and in some cases, may even be preferable.

Figure 3:
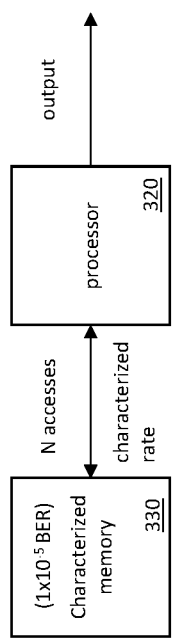
FIG. 3 is a logical block diagram of a first exemplary embodiment of an apparatus configured to search for proof-of-work (POW) with the aforementioned Ethash algorithm, in accordance with the present disclosure.

FIG. 3 illustrates one exemplary embodiment of a first memory architecture according to the present disclosure. As shown in FIG. 3, the exemplary apparatus is configured to search for proof-of-work (POW) with the aforementioned Ethash algorithm in a manner that does not reject invalid solutions. The system includes a "characterized" memory 330 and a processor 320. As before, the characterized memory 330 stores an Ethash specific directed acyclic graph (DAG).

Within the present context, the term "characterized" is used to describe a memory device that has been verified (empirically tested or otherwise) to provide at least a specific level of performance over a range of conditions. Typically, general compute memories are only "specified" for an identified performance under standardized conditions via factory run pass/fail memory test; there is no commercial value to testing general compute memories beyond the pass/fail test. In contrast, characterized memories may include memories from experimental memory runs, refurbished memories, faulty memories, or other applications that undergo a more comprehensive set of testing to assess performance over a range of operating conditions.

For example, with respect to POW solutions, 99 of 100 attempted header/nonce combinations could be valid with characterized memories. A low-end memory (e.g., a memory device that is nominal rated or specified for lower performance relative to higher-class devices) can be overclocked at higher speeds to generate sufficient POWs. Memories may be overclocked using higher voltages to achieve acceptable error rates. Moreover, since the memory POW can tolerate much higher error rates than normal computation, the memories can be overclocked at normal voltages (resulting in longer overclocked lifetimes).

In other words, using characterized memory for mining consistent with the present disclosure will intentionally tradeoff errors for other benefits e.g., improved performance, reduced cost, improved memory life. For example, if 3% of results are invalid but the results are being generated 25% faster, the overall acceleration of the system is 21.25% (e.g., 125% faster times 97% accuracy). The overall boost may be even greater in "race" scenarios such as cryptocurrency mining (i.e., only the first miner to locate a solution is rewarded, the second miner loses out even if he eventually locates the same solution).

Referring back to FIG. 3, the characterized memory is used at its characterized rate to achieve a performance that is acceptable for its operation. For example, within the context of the Ethash POW system efficiency curve of FIG. 2C, a BER of $1 \times 10^{-5}$ provides a system efficiency of approximately 90%. Consequently, the characterized memory 330 may be clocked at a rate that achieves a 90% system efficiency (e.g., the rate characterized for BER of $1 \times 10^{-5}$).

In one such embodiment, a typical general compute memory is "specified" for an identified performance under standardized conditions; however the same memory may be further characterized in subsequent testing to provide e.g., diminishing performance at higher speeds. Once sufficiently characterized, the general compute memory may be used as a characterized memory when run at its higher rate to achieve much higher bandwidth.

For example, consider a GDDR DRAM that has been characterized to provide a $1 \times 10^{-18}$ BER at a first Gb/s rate, and is additionally characterized at a 50% overclocked Gb/s rate that provides a lower BER of $1 \times 10^{-5}$. In this manner, the memory may be used at its 50% overclocked rate to achieve a performance boost in memory bandwidth for Ethash mining.

In another such embodiment, the characterized memory may be e.g., experimental memory, refurbished memory, faulty memory, and/or second class (or even lower class) memories. Such memory devices may be pressed into Ethash mining at substantially lower cost than general compute memories. For example, experimental memory prototypes that cannot be sold may have been sufficiently characterized to be acceptable for Ethash mining. Use of such characterized memories would be beneficial for, e.g., memory manufacturers that have second-class memories available en masse because of fabrication issues, and would otherwise have limited or no use for them. Another such case may be second class memory that does not meet commercially relevant JEDEC memory standards, and therefore may be sold to consumers at steep discounts. Accordingly, the present disclosures sets forth another use for such second class memory. Similarly, refurbished memory that otherwise would be discarded may be suitable for Ethash mining.

Additionally, as is discussed in greater detail hereinafter, the mathematical relationship between corrected BER and system efficiency can be used to in reverse to infer the corrected BER of a memory. In other words, memories that have not been characterized or that have degraded in performance since characterization, can be monitored to infer a likely corrected BER.

Artisans of ordinary skill in the related arts given the contents of the present disclosure will readily appreciate that the foregoing example is purely illustrative; various considerations may be considered in determining acceptability of operation. For example, the acceptable error rate may be based on the amount of penalty imposed by the network; shorter temporary bans may result in a higher acceptable BER, longer or even permanent bans may require much lower BER.

Example Operation #2, Validating Characterized Memory

As discussed supra, characterized memories can be directly used in Ethereum POW mining. However, as previously alluded to, broadcasting invalid solutions directly to the network from a characterized memory could have undesirable consequences or invoke countermeasures (e.g., the submitter to be banned temporarily or permanently from the network, or at a minimum, waste resources on generating and broadcasting false POW solutions that will not result in any rewards). Accordingly, as shown in FIG. 4, the present disclosure also envisions a mechanism to validate POW solutions before they are broadcast, such that characterized memory can be used without the risk of suffering undesirable consequences.

Figure 4:
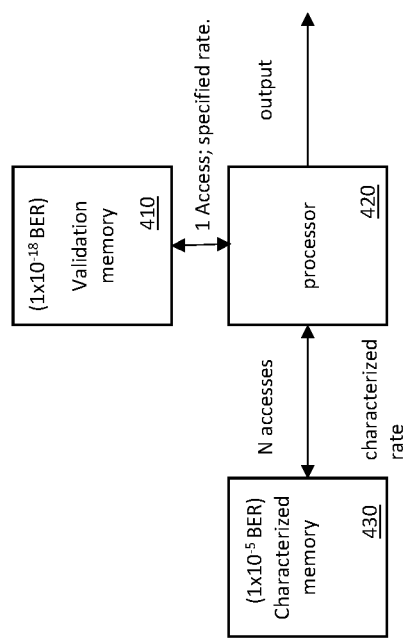
FIG. 4 is a logical block diagram of a second exemplary embodiment of an apparatus configured to search for proof-of-work (POW) with the aforementioned Ethash algorithm, in accordance with the present disclosure.

FIG. 4 depicts one exemplary embodiment of a second memory architecture according to the present disclosure. As shown in FIG. 4, the memory architecture includes a characterized memory 430 and processor 420 apparatus that includes a validation memory 410. During operation, the second memory architecture uses the characterized memory 430 to search for, and generate, POW solutions in accordance with the aforementioned processes; thereafter the validation memory 410 is used to validate the generated POW solutions. For example, the processor 420 can execute a hash algorithm utilizing the characterized memory 430 to find a POW solution using the characterized rate (e.g., which may be overclocked for acceptable application performance of e.g., $1\times10^{-5}$ BER), and then execute a one-time look up verification of the POW solution utilizing a general compute memory at its specified rate (e.g., $1\times10^{-18}$ BER).

As previously alluded to, Ethash is asymmetric in that a solution is difficult to find, but relatively easy to verify. Within the context of FIG. 4, the validation memory 410 can be used to verify the POW identified by the characterized memory 430 with low processor utilization and a relatively small amount of memory. For example, empirical experiments show that the Ethash POW mining takes approximately 12-15 seconds to find a suitable header/nonce solution, whereas validation can occur almost instantaneously.

In one exemplary embodiment, the characterized memory 430 is operated to maximize overall search speed (even at the expense of accuracy), whereas the validation memory 410 is used to accurately verify the search (which does not need to be done quickly). A variety of techniques can be used to maximize the search speed and/or minimize costs of the characterized memory 430. For example, some variants may overclock the characterized memory, other variants may remove internal memory overhead (e.g., ECC, eFuse, CRC, etc.) which take time and consume memory bandwidth. In another such example, a very inexpensive memory can be overclocked to achieve comparable rates to much more expensive general compute alternatives.

Similarly, a variety of techniques can be used to improve accuracy and/or reduce cost of the validation memory 410. For example, the validation memory 410 can use a very slow memory that has good BER. In other variants, the validation memory 410 can use memory technologies that are optimized for other applications. For example, a DRAM (which is volatile) can be used to quickly and inexpensively mine for POW, whereas a flash memory (which is non-volatile) can be used as a low-power validation memory.

Additionally, the memory architecture of FIG. 4 provides additional synergies which may be unavailable to e.g., the simpler memory architectures. In one exemplary embodiment of the present disclosure, the validation memory 410 tracks the error rate of the characterized memory 430 and monitors memory performance in view of an expected solution density function. For example, within the context of Ethereum POW mining, the validation memory 410 can determine how well the characterized memory 430 is performing over time. More directly, if the rate for the characterized memory is expected to yield a solution density of 90% (e.g., a BER of $1\times10^{-5}$), but the actual solution density is closer to 70%, then the memory is underperforming (e.g., roughly equivalent to a BER of $\sim5\times10^{-5}$).

In some variants, the underperforming characterized memory may be re-characterized for a lower performance. For example, by reducing clock frequency, the memory performance may return to acceptable levels. In other cases, the characterized memory may still offer sufficient solution density to continue operation in its degraded state. In still other implementations, the processor 420 may initiate corrective action (such as more frequent refreshes, or a rewrite of the DAG entries).

As a brief aside, DRAM memory technology stores information as a charge in a capacitive cell; over time, the charge in the DRAM cell decays, thus the DRAM cell must periodically be "refreshed" with the proper value. In some cases, a cell may have a "soft error" because the charge has decayed to the improper value; soft errors may be a product of manufacture (e.g., manufacturing tolerances may result in slightly more or less capacitance for each cell), probabilistically occur over time, and/or may even be intentionally allowed to accumulate. For example, refresh consumes memory bandwidth (the cell cannot be accessed during refresh) thus refreshing may be reduced to increase memory bandwidth. In contrast, malfunctioning cells are considered "hard errors." Common examples of hard errors include memory cells that are stuck "high" or "low." Analogous functionality is present in other forms of memory (e.g., SRAM, Flash, etc.).

In some variants, correctable and uncorrectable faults in the characterized memory 430 may be categorized differently. As previously noted, so-called "correctable" faults can be corrected with e.g., repair and/or error correcting codes (ECC). However, "uncorrectable" faults cannot be corrected due to e.g., exhaustion of repair resources and/or limitations of ECC capability. More directly, the probabilistic accumulation of correctable errors during normal operation can be remedied with e.g., a memory rewrite and/or more frequent refresh intervals; in contrast an accumulation of uncorrectable errors indicates that the characterized memory 430 should be replaced.

In some variants, rewriting the characterized memory 430 merely entails an entry-by-entry copy of the validation memory 410. In other words, the validation memory 410 has the "clean" copy of the Ethereum DAG. The DAG need not be regenerated from scratch for the characterized memory 430.

Artisans of ordinary skill in the related arts given the contents of the present disclosure will readily appreciate that the foregoing example is purely illustrative; various implementations of the foregoing may be modified to adjust a variety of parameters to more or less aggressively mine POW without the risk of suffering undesirable consequences (e.g., higher BER, higher clock rates, and/or lower cost components).

Example Operation #3, Parallelized Characterized Memories

As discussed supra, Ethash validation is highly asymmetric in that a solution is difficult to find, but relatively easy to verify. Additionally, the nonce selection for Ethash is designed to allow any number of miners to search for solutions in parallel (e.g., each miner randomly selects a nonce). Thus, as shown in FIG. 5, the present disclosure also envisions architectures that can be used to heavily parallelize characterized memory searching.

Figure 5A:
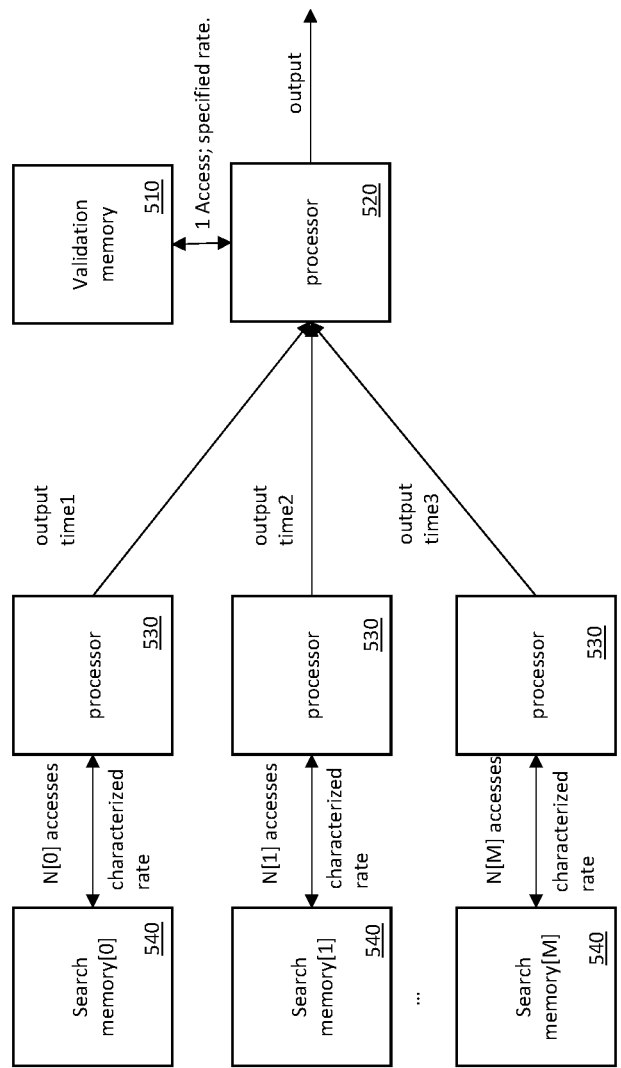
FIG. 5A is a logical block diagram of a third exemplary embodiment of an apparatus configured to search for proof-of-work (POW) with the aforementioned Ethash algorithm, in accordance with the present disclosure.

FIG. 5A is one exemplary embodiment of a parallelized memory architecture according to the present disclosure. As shown in FIG. 5A, the parallelized architecture includes at least one validation controller apparatus 520, which is in data communication with both (i) one or more validation memory 510 and (ii) one or more searching processor apparatus 530. Searching processor apparatus 530 can perform a memory search or hash algorithm utilizing a plurality of search memory (characterized memories 540). In some implementations, each of validation controller apparatus 520 and searching processor apparatus 530 can be any one of an application-specific integrated circuit (ASIC) central processing unit (CPU), field-programmable gate array (FPGA), or graphics processing unit (GPU), or yet other types of devices.

With respect to an exemplary operation utilizing the validated memory apparatus of FIG. 5A, each one of the searching processor apparatus 530 can execute a memory search algorithm (e.g., Ethash) to find a POW solution within the memory space of their corresponding searching memory 540. When a header/nonce solution is found, the searching processor apparatus 530 forwards the POW solution to the validation controller apparatus 520. The validation controller apparatus 520 then validates the POW solution against the validation memory 510. If the header/nonce combination is valid, then the valid solution can be broadcast to the network for validation by the peer nodes of the network. If the solution is invalid then the solution can be ignored or utilized in other ways as discussed in more detail further below.

Figure 5B:
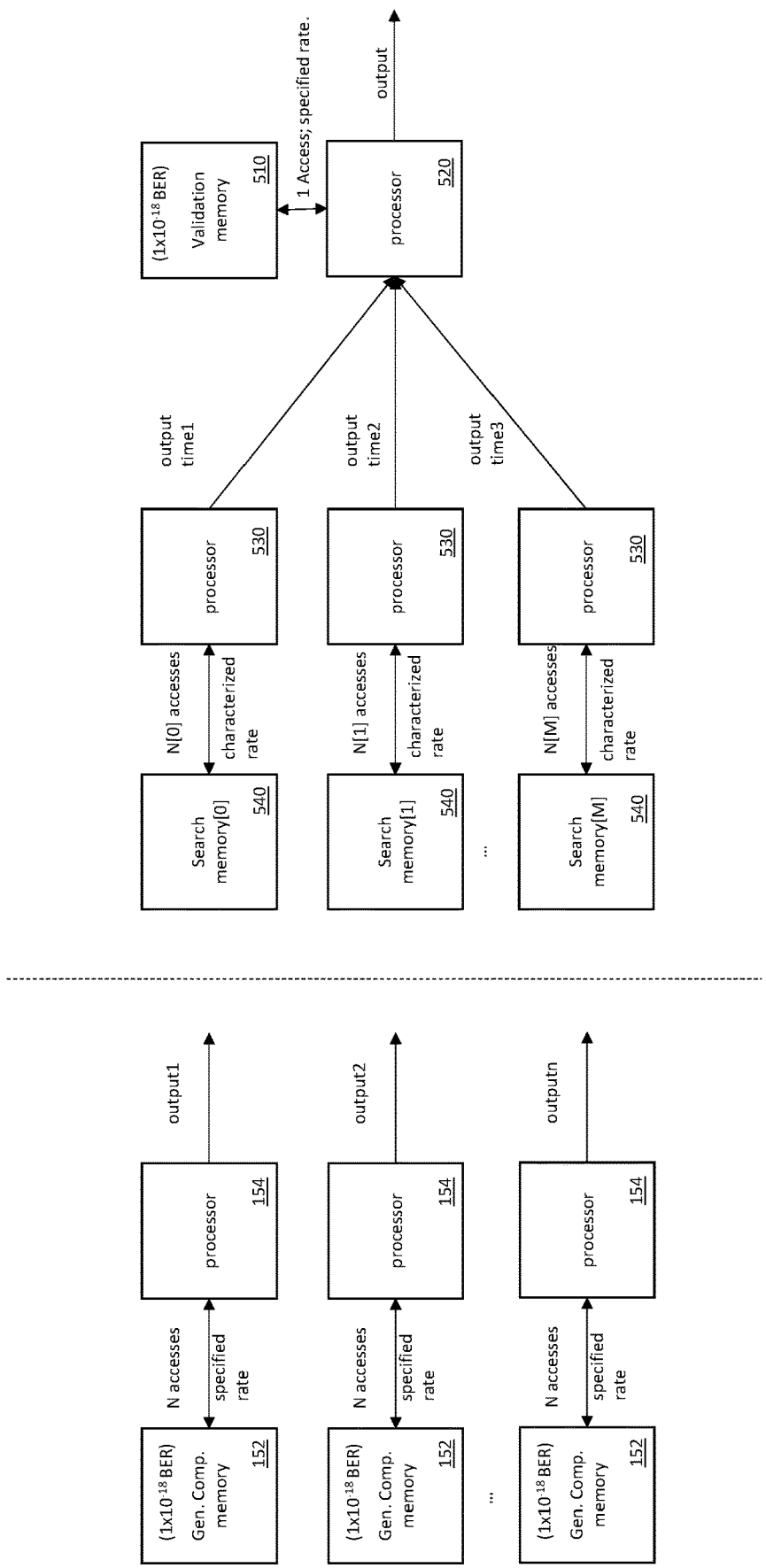
FIG. 5B is a side-by-side comparison of the exemplary embodiment of FIG. 5A and a group of prior art apparatus (such as was described in FIG. 1B).

The highly asymmetric nature of Ethash allows for high levels of parallelization; a single validation controller apparatus 520 can validate results from an extensive number of searching apparatus 530, 540 (e.g., thousands or tens of thousands of searching apparatus) because empirically validation is $\sim 1 > 10^{-10}$ times faster than generating the POW. For example as shown in FIG. 5B, a side-by-side comparison of the exemplary embodiment of FIG. 5A and a group of prior art apparatus (such as was described in FIG. 1B) are shown for comparison. As shown in FIG. 5B, the general compute memories 152 must operate at their specified rate to achieve the general compute BER ($1 \times 10^{-18}$); in contrast, the search memories 540 can be overclocked (e.g., a 50% memory bandwidth improvement) according to their characterized rates; the resulting higher BER ($1 \times 10^{-5}$) can be corrected for with a validation memory 510 using its specified rate to achieve the general compute BER ($1 \times 10^{-18}$).

Furthermore, it is noted that this exemplary aspect of the present disclosure (i.e., validation of unreliable search results before the broadcast thereof) is not known from the existing art. Although it is well-known for peer nodes of a network, such as the Ethereum network, to validate solutions broadcast by miners, existing validation mechanisms are focused on the untrusted nature of the actors and assume that faults are malicious. In contrast, the disclosed validation techniques described herein can assume that faults are caused by soft/hard errors of characterized memories that may be unreliable (or operated out of normal operating ranges). More directly, the processors 520 and 530 of the exemplary embodiment are not concerned with trust.

Moreover, other solutions deter one from using characterized memory for the reasons explained elsewhere herein (e.g., wasting resources, and possibly a ban from the network); in fact, existing implementations assume that the results from general compute memories are valid and need not be checked before broadcasting the results to the network. In other words, if the miner is not malicious and assumes that their memory has a low (e.g., effectively zero) error rate, then there is no motivation for the submitter to check their own results before broadcasting them.

In one exemplary embodiment, each of the processors and/or memories are capable of isolated operation without other processors in the processing system. In one such variant, each search processor 530 can independently throttle up or down its memory bandwidth to optimize its performance. For instance, based on a determination that its search memory can have a higher BER, one search processor 530 can throttle its clock rate up to increase performance and (up to an acceptable BER). In contrast, another search memory that has degraded with use may already have a high BER; therefore, its associated processor would not change its clock rate (or potentially even throttle down). Other independent functionalities may include e.g., maintenance (as described in detail further below), speed reduction, and/or power consumption reduction.

In other embodiments, the search processors 530 and validation processors 530 may be dependent on one another for one or more operational modes. For example, a validation processor may centrally track error rates across the entire parallelized memory apparatus and/or trigger memory re-writes of the Ethash DAG when appropriate.

Artisans of ordinary skill in the related arts given the contents of the present disclosure will readily appreciate that the foregoing example is purely illustrative; various implementations of the foregoing may be modified to adjust a variety of different network topologies. While the illustrated embodiment is presented within the context of a single operating entity, other distributed implementations may be suitable where trust is established in other ways (or altogether unnecessary). For example, a community of users that establish trust collectively can mine Ethash. In other cases, a community of users may not care about its miners being malicious (and submitting many invalid header/nonce solutions).

Methods for Searching Characterized Memory

Figure 6:
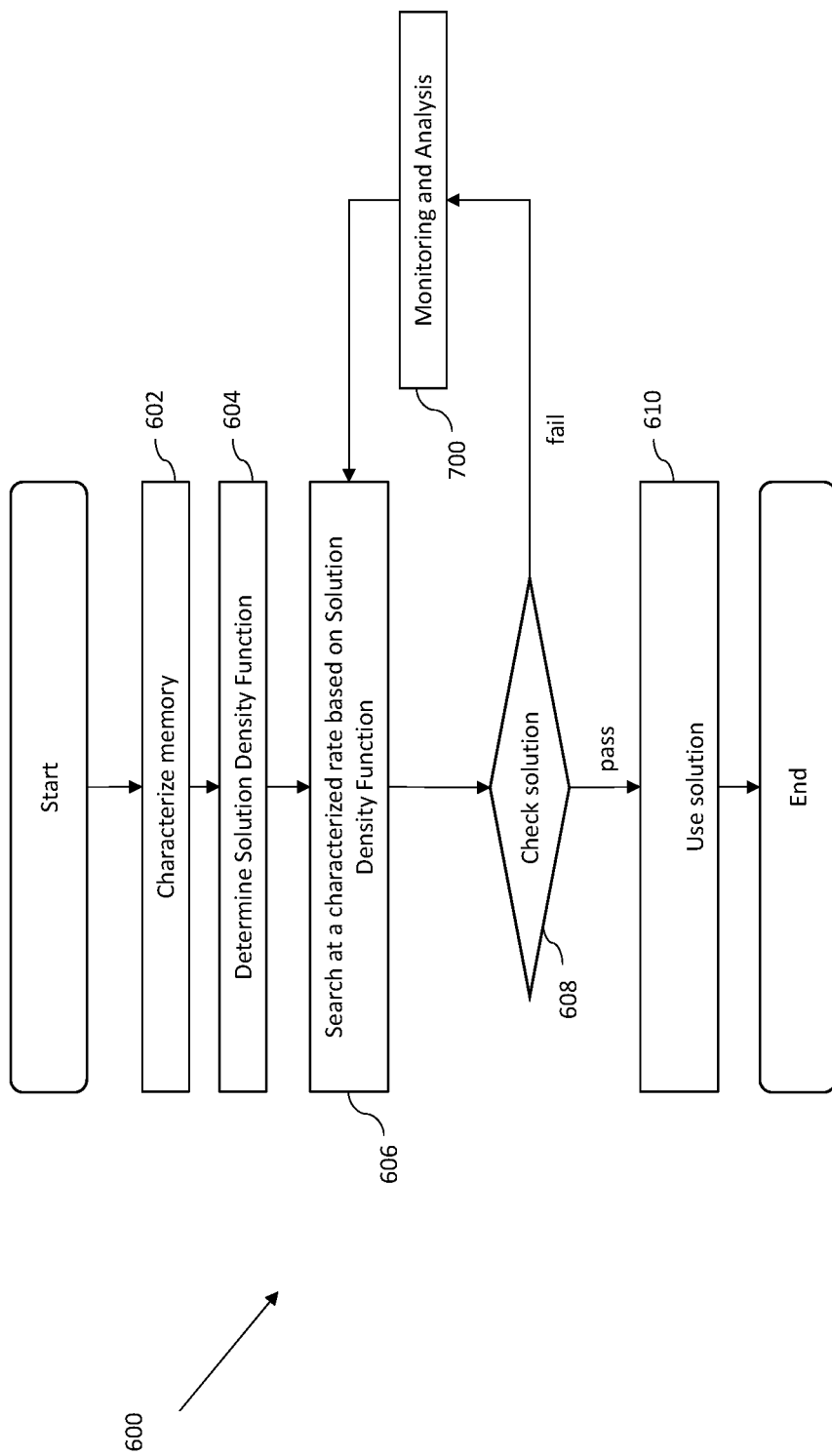
FIG. 6 is logical flow diagram of one embodiment of a method for searching a characterized memory, in accordance with the present disclosure.

FIG. 6 is a logical flow diagram of one generalized method 600 for searching a characterized memory. In one exemplary embodiment, the characterized memory is used with an application having an expected solution density.

At step 602 of the method 600, a memory device is characterized. In one exemplary embodiment, memory device characterization includes a determination of one or more levels of actual or predicted performance over a range of conditions and/or operational parameters. Common metrics for performance include without limitation: bit error rate (BER), bandwidth, correctable/uncorrectable fault ratio, data rate, latency, throughput, and/or any number of other methods to characterize data generated by the memory. Common conditions and/or operational parameters include without limitation: refresh rate, clock rate, cycle time, voltage, temperature, humidity, and/or any other factor that can be adjusted for memory operation.

While many of the discussions provided herein are directed to memory reads, the techniques disclosed herein may be applied with equivalent success to any memory bandwidth, usage, or access operations. For example, large amounts of memory reads, writes, fuses, processor-in-memory operation and/or any combinations or hybrids thereof may be substituted or combined with equivalent success.

In one exemplary embodiment, the characterization is explicitly performed via e.g., a test process. For example, a second-class memory device may be characterized to have a bit error rate (BER) performance over a range of clock rates by writing a test pattern and then reading the test pattern out of the memory device at increasing higher clock rates.

In other embodiments, characterization may be implicitly determined based on e.g., performance within an application and/or historic data. For example, a memory that is generating ~90% valid solutions with the Ethash algorithm can be inferred to have a BER of approximately $1 \times 10^{-5}$ based on the expected solution density for the Ethash algorithm.

In some variants, characterization may be interpolated or extrapolated from a subset of explicitly or implicitly derived performance data.

In some embodiments, characterization may be determined based on comparisons to components of similar technology and performance. For example, models of "aged" memories are commonly used by memory manufacturers to predict the behavior of refurbished memories. In some cases, even though there may not be identical memory technologies, computer modeling may be able to predict likely performance for substantially similar technologies (e.g., as between different technology nodes or generations of the same memory type). Still other statistical predictions techniques may be used where there is a sufficient sample size of a representative population of analogous memory devices.

In some embodiments, characterization may start with an initial estimate and dynamically update with information over time. For example, experimental memory technologies may use an initial estimate of performance and steadily improve on characterization models over time as manufacturing is improved and/or firmware updates for the memory are honed during development.

Various other techniques for characterizing memory performance over a range of operational parameters will be readily appreciated by artisans of ordinary skill given the contents of the present disclosure.

In one exemplary embodiment, the memory device can provide its characterization data to an external device (such as a processor, programmable logic, or other logic). In one embodiment, the memory device stores a data structure that identifies one or more operating parameters and an associated performance. The data structure may be stored within the memory device itself (e.g., as part of the DRAM memory array) or within a separate NOR, EPROM, fuse, register or other readable medium. During operation, the memory device may be queried for its data structure. For example, the data structure may include a table of operating voltages and/or clock rates and an associated bit error rate (BER) performance. In other embodiments, the memory device may be associated with a data structure that is remotely stored identifying the memory device's characterization. For example, the memory device may include a unique identifier that can be queried within a centralized database. In still other embodiments, the memory device may be tested and marked with identifiers indicating a plurality of different characterizations. In one such implementation, a memory may be marked with a set of operating parameters which provide first-class performance, second-class performance, etc. Still other techniques for storing and/or retrieving the characterization data may be used with equivalent success.

At step 604 of the method 600, a solution density function for an application is determined.

In one exemplary embodiment, a "solution density function" defines the probability of finding a valid solution for the application within a solution space. For example, a solution density function for POW mining may describe the probability of discovering a solution as a function of BER. In some cases, the solution density function can be used to determine an overall system efficiency i.e., the relative efficiency of characterized memory performance relative to general compute memory performance. More generally, the solution density function and/or system efficiency curve may be used to select a desired output for a memory bound applications as a function of one or more memory performance parameters. Moreover, while two dimensional mathematical relationships have been described supra, substantially more complex mathematical functions may incorporate e.g., multiple dimensions, statistical components, systems of equations, non-linear behavior, piecewise modeling, parametric modeling, geometric modeling, differential analysis, and/or any other form of mathematical expression.

Additionally, while the aforementioned examples have been described in the context of a memory bound POW algorithm for a cryptocurrency, the various techniques described herein may be applied to any application that is asymmetrically memory bound. As used in the context of a memory hard or memory bound application, the term "asymmetric" is characterized by using large amounts of memory bandwidth (reads/writes) to generate a solution that can be verified or used with small amounts of memory bandwidth. Common examples of asymmetric memory bound applications may include biometric searches (e.g., fingerprint searching through a fingerprint database, retinal scanning, DNA record searching, etc.), environmental or natural population characterization (e.g., characterizing multipath fading effects for telecommunications, climate prediction, biological population simulations, etc.), artificial intelligence and/or machine learning applications (e.g., audio or visual image recognition, object recognition, etc.), probabilistic and/or stochastic pattern recognition, and/or any number of other memory based simulation and/or modeling In some embodiments, a solution density function for an error-tolerant application may identify the number of errors that can be tolerated before the error-tolerant application fails. In still another embodiment, a solution density function for a probabilistic or stochastic application may identify the noise floor below which a signal of interest is indistinguishable from noise. In still another embodiment, a solution density function for a machine learning or artificial intelligence system may identify the maximal sparsity of information below which the processing complexity is infeasible to model. Similarly, system efficiency for error-tolerant applications may be used to select and/or track performance; dynamic performance metrics may be used to dynamically adjust error-tolerant application parameters and/or infer when system maintenance is required.

Common examples of error-tolerant applications include without limitation: SMART systems (Self-Monitoring, Analysis and Reporting Technology), error detection based systems (e.g., cyclic redundancy checks (CRC), etc.), error correction schemes (e.g., hamming and parity codes, etc.), consensus systems (e.g., majority voting schemes, blockchain, etc.). More generally, as used herein, the terms "error-tolerant" and/or "error-resilient" refer to systems that identify when errors occur and correct or remove the source of error such that the system remains error free.

In one exemplary embodiment, the solution density function may include analytically or mathematically determined components. For example, within the context of the aforementioned cryptocurrency POW mining, the likelihood of finding valid solutions within the solution space can be mathematically derived based on assumptions as to the e.g., uniformity of search and a probability density. Other applications may assume non-uniform searching, varying probability densities, likelihood as a function of validity/invalidity, and/or any number of other factors. Moreover, it is further appreciated that solution density functions may change over time. For example, in the context of the aforementioned cryptocurrency POW mining the number of valid solutions which are discovered but which have already been claimed may affect success rates. Thus, some variants may attempt to empirically account for successful results as a historical function of solutions within an epoch (e.g., the likelihood of finding the first solution in the epoch may be high, the likelihood of finding the last unique ($30,000^{th}$) solution of the epoch may be substantially lower). In some cases, such information may be useful to determine the aggressiveness/conservativeness of characterized memory use (e.g., throttling up or down search speeds based on the epoch progress).

In other embodiments, the solution density function may include empirically determined components. For example, in the context of the aforementioned cryptocurrency POW mining behavior may historically vary as a function of cryptocurrency pricing. The population of active miners significantly impacts the rate at which unique solutions are claimed. While human behavior may be difficult to mathematically model, historical data can provide sufficiently adequate predictions to generate an empirical model of the solution density function. Additionally, many applications are notoriously difficult to mathematically model and/or infeasible to model (e.g., weather, large neural networks, large population simulations, etc.); in such applications, historical data may be used to determine an empirical model of the solution density function, or otherwise inform or modify a base solution density function.

In some embodiments, the solution density function may incorporate commercial interest or business model considerations. Cryptocurrency speculation has been very erratic since its inception; at some high points, proof-of-work rewards could be substantial, for example, mining during a cryptocurrency bubble could hypothetically completely offset the cost of e.g., a research and development phase for an experimental memory technology. Similarly, during lulls in prices, the return on cryptocurrency mining may be worthless or even a net loss (when considering alternative revenue streams for memory appliances). Consequently, the solution density function may account for commercial returns or other business considerations. Common examples of such considerations may include: profit/loss, expense/revenue, appreciation/depreciation, contractual requirements, and/or any number of other financial incentives and/or penalties.

At step 606 of the method 600, the characterized memory is used to generate solutions based on a characterized rate based at least in part on the solution density function.

In one exemplary embodiment, a processor apparatus executes a search or hash algorithm (such as, e.g., the Ethash algorithm described supra) to generate an Ethereum POW solution from one or more characterized memories. In one such variant, the memory one or more characterized memories are second-class memory, such as memory with BER that is higher than permissible for first class memory (e.g., $1\times10^{-18}$ BER). In one such variant, second-class memory must minimally exceed a floor BER threshold (e.g., $1\times10^{-5}$ BER). In some implementations, the error rate can being caused from defects (for instance, from fabrication issues, experimental technologies, refurbished memory, etc.). In other implementations, the error rate is intentionally induced such as by e.g., overclocking the memory to increase performance.

In the previously described implementations, solution generation is based on memory reads within a search space. In alternative embodiments, solution generation may use memory writes. For example, some applications may use substantial memory bandwidth in a write process, where subsequent accesses only require low bandwidth reads. More generally, the various aspects of the present disclosure may be used in any type of memory access (reads, writes, fusing, processing-in-memory, etc.).

In one embodiment, the characterized rate is selected to achieve a memory performance. For example, in one such implementation, the characterized rate is selected to achieve a bit error rate (BER). Other variants may select a characterized rate to achieve a desired e.g., bandwidth, correctable/uncorrectable fault ratio, data rate, latency, throughput, etc. In alternative embodiments, the characterized rate is selected based on one or more operational considerations.

While the foregoing examples are presented in the context of a characterized rate, any operational parameter or condition may be substituted with equivalent success. Common conditions and/or operational parameters include without limitation: refresh rate, clock rate, cycle time, voltage, temperature, humidity, and/or any other factor that can be adjusted for memory operation. For example, memory searching may be use a characterized voltage to achieve a specific power consumption. In other examples, the memory may be operated at specific extreme temperatures (e.g., heat, cold, and/or humidity). For example, oil drilling applications may collect copious amounts of data under extreme conditions at the drill site; these data can be analyzed by machine learning algorithms (under normal conditions) to identify nearby deposits of oil or other precious materials. Other common applications include space, and near-space data collection. Moreover, many so-called cloud or fog based applications can collect data in a distributed manner (in a variety of different operating conditions) for subsequent post-processing or data mining with error-tolerant/probabilistic computing.

In some such implementations, the characterized parameters may be adjusted dynamically. For example, memory search speeds can be throttled up or down so as to tradeoff between bit error rate (BER) and power consumption. Dynamic adjustment of characterized parameters may be used to adjust for a variety of different considerations. In other such implementations, the characterized rate is selected statically. For example, simple data mining appliances may overclock all memories to the same rate, and manage differences in BER with error-tolerant computing. Still other variations of the foregoing may alternate between dynamic and static parameterizations so as to determine the most effective operation mode. For example, an apparatus using experimental memory technologies may dynamically adjust voltage (holding all other parameters constant) for one iteration, and then dynamically adjust clock rate (holding voltage constant) for a subsequent iteration to determine the ideal combination of voltage and clock rate.

While device performance was tied to solution density in the illustrative examples, there may be situations where there is no relationship (or only a slight relationship). In one embodiment, the characterized parameter is selected based on solution considerations. For example, a characterized rate may be selected to achieve a particular system efficiency. In some such variations, different solution considerations may be weighted differently. For example, false positive solutions may be more or less heavily weighted than false negatives.

In a related tangent, there may be applications that are not dependent upon device performance. In such cases, the characterized parameter may be selected based on application considerations. For example, the application may have specific processing, memory, or other resource considerations that should be accounted for when using the characterized memory. For example, an application may perform both uniform searching and non-uniform searching; uniform searching may allow for more lax refresh rates and higher clock rates, whereas non-uniform searching may require stricter refreshing and slower clocking.

In one embodiment, the characterized rate is selected based on commercial interests and/or business considerations. As previously noted, certain commercial and/or business considerations may warrant more or less aggressive memory use. For example, cryptocurrency rewards may be sufficiently lucrative to operate memories at rates and voltages high enough to be destructive. In other examples, memory may be very expensive and worth keeping functional as long as possible. Still other variations of the foregoing may be substituted by artisans of ordinary skill in the related arts with equivalent success given the contents of the present disclosure, the foregoing being purely illustrative.

In one exemplary embodiment, a population of characterized memories are used. In some variants, the memories can be parallelized (e.g., using different nonces, salts, hashes, or other forms of seeding). In some cases the seeding may be randomized; in other cases, seeding may be coordinated. In other variants, the memories may be assigned to different portions of an application (e.g., different search spaces). In still other embodiments, multiple memories perform a common search and use a majority "vote" to provide outputs.

In still other variants, the memories may be "striped" (as in a RAID type configuration). In some striping variants, the memories may include various portions of data, redundancy information (parity), correction information (e.g., hamming codes, CRC) and/or some combination thereof.

In some cases, different devices within a population of devices may be individually configured to run with different operational parameters and/or desired performances. For example, in some cases it may be desirable to run some devices at very high speeds and other devices at lower BER. For example, a diverse population of devices may excel in different aspects of an application; e.g., uniform searching over a large search area may be done with many devices at high speed (e.g., redundancy of memory searches), whereas non-uniform searching of a sub-sector may be performed with a single device at lower BER (which can be slower but must be accurate).

When a solution is found in step 606, some embodiments may directly provide without further checking. In other embodiments, solutions should be checked before use (steps 608 of the method 600). In some variants, an additional monitoring and analysis process 700 is performed if the solution fails the checking procedure (described in greater detail below).

In one exemplary embodiment, solutions from multiple searching apparatuses can be checked with the same checking apparatus, thereby providing a more distributed and efficient approach. In other embodiments, a searching apparatus checks its own solutions. In one variant, checking a solution takes much less time than finding the solution; i.e., the application is asymmetric.

In the present context, the term "valid" and/or "validation" refers to a solution which satisfies a requirement external to the memory device e.g., a validity check of the application. For instance, a valid Ethash result is a header/nonce combination for a directed acyclic graph (DAG) that exceeds a predetermined target threshold. As used herein, the term "verify" and/or "verification" refers to a value that is checked to be true or accurate internal to the memory (e.g., neither a soft or hard error). While validity checks and verification checks are usually synonymous, not all applications treat validity and verification identically.

In one exemplary embodiment, a validation apparatus checks that the solution is valid for external use. In one such implementation, the validation apparatus includes a first-class memory, such as memory with general compute BER (e.g., $1 \times 10^{-18}$ BER or better). In some implementations, the validation process includes checking whether the header/nonce solution is unique and verifying that the DAG transitions result in digested mix that exceeds a target threshold. If the identified POW solution is valid, it is published/broadcasted to the network to be validated by the peer nodes of the network. Conversely, if the header/nonce solution is invalid (for either lack of uniqueness or incorrect DAG transitions) then the solution is ignored.

In some embodiments, a verification apparatus verifies that the identified solution is an accurate memory access. For example, if the solution was identified at a first clock rate characterized with a first BER (e.g., $1 \times 10^{-5}$), then the verification apparatus may re-read the memory locations at a lower speed characterized by a more accurate BER (e.g., $1 \times 10^{-18}$). In some cases, re-reading the same memory location may be counterproductive because the original read may have refreshed the memory location (e.g., reading a DRAM location results in re-charging (or discharging) the capacitive cell); thus in some cases, the re-read may be performed at the lower clock rate on a memory with mirrored data. If the identified solution is verified, then it can be used. Conversely, if the solution is not verified then the identified solution may either be ignored or used in its corrected form.

In some embodiments, a checking apparatus may ensure that the returned result appears to be "sane." Sanity checking refers to checks which do not validate or verify, but only filter values that are clearly incorrect based on some predetermined expectation. Common examples of sanity checks include checking e.g., that a value is within a range of acceptable values, that the value complies with accepted formats, that the value does not significantly deviate from historic values, that the value does not deviate from expected statistical behavior, and/or any number of other criteria. For example, certain types of machine learning and/or artificial intelligence applications may include limitations on data ranges or results (e.g., an oil drill cannot be drilling beyond a maximum or minimum value, certain DNA sequences do not generate proteins, etc.)

Moreover, while the foregoing discussions are presented in the context of checking a solution using e.g., a validation memory, other forms of checking may be based on computation and/or external information. More generally, any technique for checking that the solution is acceptable for use may be substituted with equivalent success. Common examples of checking may include e.g., error checking (CRC, hamming, parity), format checking, authentication, authorization, error correction, and/or reformatting.

Per step 610, the solution can be used within the application.

In one exemplary embodiment, the validation apparatus transmits or broadcasts the validated solution to a plurality of peers in an Ethereum network for validation by at least some of the peer miners. Each data subset (e.g., transaction block) is stored on nodes of the system or nodes that are in communication therewith. Once a peer miner in the network puts forth processing effort to validate the block, it circulates the block for the transaction to other nodes for consensus. When a consensus is reached (e.g., that the block is valid), the block is appended to the database (e.g., a distributed ledger system such as blockchain). For example, the valid block can be appended to the blockchain in a time stamp order. In the context of Ethereum, once the block has been validated and added to the blockchain, the submitter can receive compensation for the work. For example, the submitter can receive a digital redeemable token in exchange for integration of the valid block as part of the blockchain. The digital token would be virtual currency (e.g., a digital coin, such as Ether, etc.). However, with respect to other contemplated applications, other types of compensation can be received, such as a fiat currency, a coupon, an exchanged service, etc.

The present disclosure recognizes that blockchain "blocks" can take on a broad spectrum of information, such as data relating to financial transactions, non-monetary transactions, and/or any other type of data record. In some cases, blocks may include referential information e.g., pointers, etc. For example, pointers could include human readable pointers, file names, file handles, uniform resource locator (URLs), uniform resource identifier (URIs), or other types of text-based addresses. In some implementations, the pointers may be document object identifiers (DOIs), which point to documents, or pointers indicating permanent references that index to supporting evidence, documents, etc. For example, the pointers may reference an indexing system, which could include the pointer address indicative of the location (e.g., specific network locations, virtual/cloud-based storage locations) for such documents. In other implementations, the blocks can include profile data, such that profiles can be generated and added to the database with the validated transaction block. Additionally, in some implementations, the data included in the transaction block can be encrypted, particularly in scenarios where the data is highly sensitive or private, such as with medical records, etc.

In some embodiments, the solution may be provided to a peer entity for use within an application. The peer entity may be trusted or untrusted. In other embodiments, the solution may be provided to a centralized entity (e.g., a cloud server), distributed among a number of entities (e.g., a fog based network) or otherwise used within a client side application. Still other network topologies may be substituted with equivalent success, the foregoing being purely illustrative.

As previously noted there are many envisioned uses for the various principles described herein. For example, the solutions may be used for e.g., biometric searches, environmental or natural population characterization (e.g., characterizing multipath fading effects for telecommunications, climate prediction, biological population simulations, etc.), artificial intelligence and/or machine learning applications (e.g., audio or visual image recognition, object recognition, etc.), probabilistic and/or stochastic pattern recognition, and/or any number of other memory based simulation and/or modeling.

Methods for Monitoring and Analyzing Characterized Memory Performance

Figure 7:
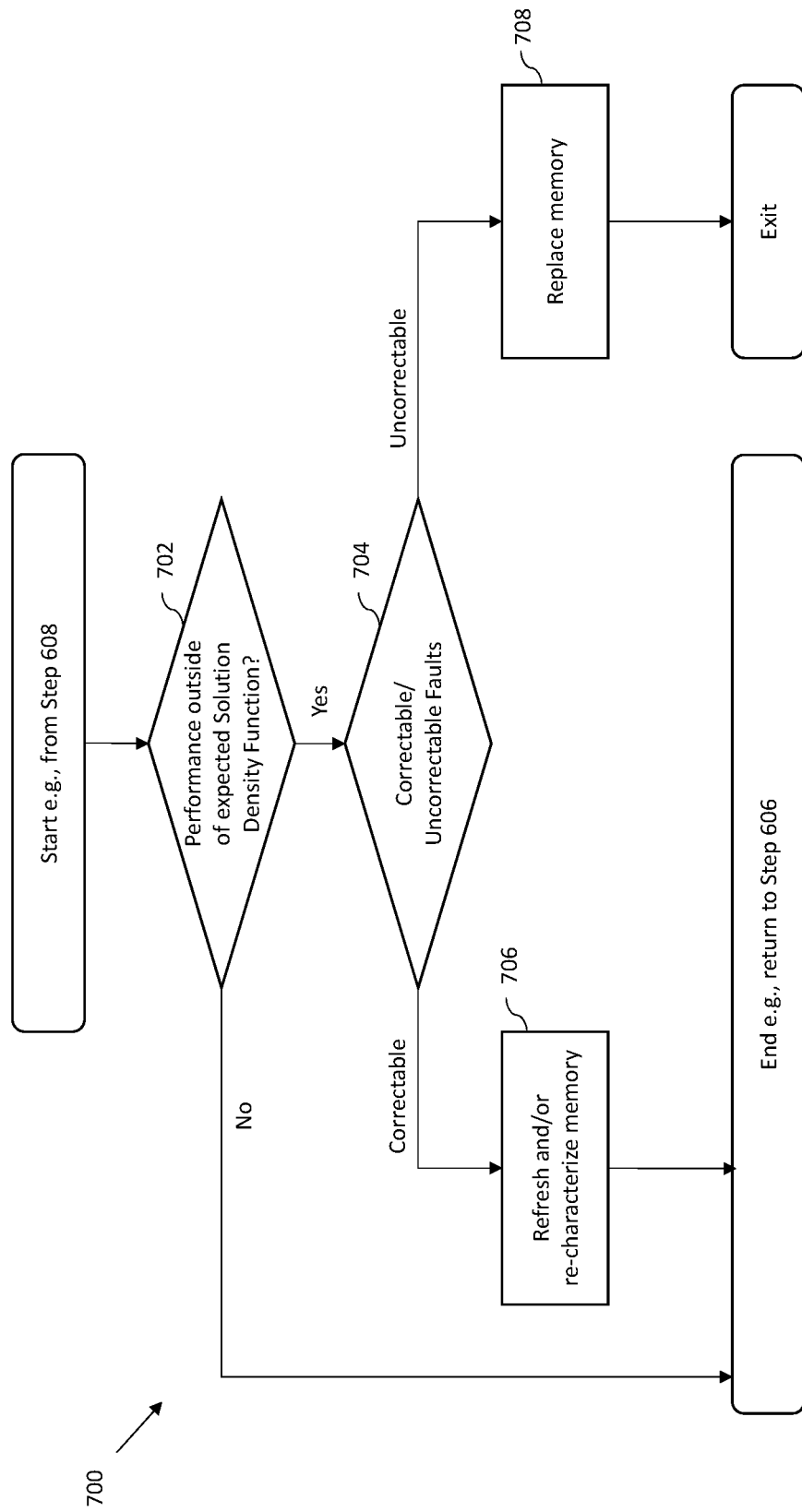
FIG. 7 is logical flow diagram of one embodiment of a method for monitoring and analyzing characterized memory performance, in accordance with the present disclosure.

Referring now to FIG. 7, a logical flow diagram of one generalized method 700 for monitoring and analyzing characterized memory performance is presented. One synergistic aspect of characterized memories and solution density functions is that the device's remaining usable life and/or performance margins can be inferred from the fault density. More directly, existing general compute memories are required to be nearly "ideal" for practical use, thus errors necessitate replacement regardless of the memory's actual usability. In fact, the unrealistically high performance requirements for general compute memories leave ample margin for many modern applications. By monitoring the performance of a characterized memory during operation, the gradual decay of hardware performance can be managed so as to maximize usable memory lifetime.

In one exemplary embodiment, the method 700 is initiated responsive to the detection of a fault (e.g., from the aforementioned step of 608 of FIG. 6). In other embodiments, the method 700 may continuously run as a monitoring process. In still other embodiments, the method 700 may be periodically performed on regular intervals (e.g., once every minute, hour, day, week, etc.), or triggered by various events. For example, event triggered monitoring may be based on e.g., a penalty event (or a frequency of penalty events). Other common examples of trigger events may include: a number of faults exceeding a designated threshold, a rate of change of faults exceeding a designated threshold, a rate of accumulation of faults exceeding a designated threshold, historic fault accumulation behavior (for similar memory technologies), user or business considerations (e.g., triggered by miner queries, automated financial performance reporting, etc.), and/or any number of other points of interest.

At step 702 of the method 700, performance is compared to the expected solution density function. In other embodiments, performance is compared to an expected system efficiency.

As discussed elsewhere herein, POW algorithms, like Ethash for example, are memory intensive, and therefore memory degradation will occur at a probabilistic rate. Different kinds of memory have different degradation rates. Accordingly, in one exemplary embodiment, each of the memories degradation rates can be monitored or tracked. For example, the degradation rate may be based on the rate of accumulating memory errors (which will increase as the memory drops off in accuracy). Once a memory has too many failures (for instance, past a certain threshold), the system can cause the degraded memory to refresh.

In one exemplary embodiment, a running proof-of-work (POW) efficiency is compared to the BER that should result from the current characterized memory operating at the characterized rate. For example, for a characterized memory having a corrected BER of $1 \times 10^{-5}$ should generate Ethereum POW with a system efficiency not below 90% (see FIG. 2C, supra). Thus, when system efficiency falls below 90%, the characterized memory is performing outside of the expected solution density.

More generally, a variety of different metrics can be used to determine operation that requires remediation. For example, a reduced data rate may indicate higher internal bandwidth consumed by error correction. Similarly, a reduced latency or throughput may indicate longer error correction intervals and/or lower yields from error correction. Still other variants may be substituted with equivalent success by artisans of ordinary skill, given the contents of the present disclosure.

In the present context, the term "outside" a solution density function or system efficiency refers to performance that exceeds the bounds (either minimum or maximum) of acceptable performance. As a related usage, the term "inside" a solution density function or system efficiency refers to solution performance that lies within the bounds of acceptable performance.

In some implementations, a margin of tolerance is implemented. For example, even though POW efficiency for the characterized memory and characterized rate should be 90%, corrective action may not be undertaken until 85% (e.g., a 5% margin). While the foregoing examples are provided in view of a threshold value (e.g., a minimum or maximum value), other forms of comparison may be used including e.g., absolute ranges, relative ranges, statistical analysis, rate of change, and/or any number of other such analytics commonly used in the quality assurance arts.

Referring back to FIG. 7, the illustrated embodiment takes no action if the performance is inside the expected solution density function or system efficiency (for example, the process can return to the aforementioned step 606 of FIG. 6). However, in other embodiments (not shown), maintenance or other routine activities may be performed even where the performance is inside the expected solution density function or system efficiency. For example, when a fault is incurred within the solution density function, the memory may be refreshed and/or one or more entries may be corrected.

When performance is outside the expected solution density function or system efficiency, then the faults may additionally be characterized as either "correctable" faults and/or "uncorrectable" faults (step 704). As previously noted, "correctable" faults can be corrected with e.g., repair and/or error correcting codes (ECC). However, "uncorrectable" faults cannot be corrected due to e.g., exhaustion of repair resources and/or limitations of ECC capability. Thus, for example, one technique for determining whether a fault is a correctable or uncorrectable fault is to write one or more sectors of the memory with the corresponding DAG section and read back the contents; if the sector is correctly written then the faults were correctable. If instead, the sector is incorrectly written, then the incorrect writes uncorrectable faults. In other variants, the memory may be removed from service and tested via traditional memory testing methods (e.g., reading and writing back a checkerboard pattern, an all "ones" and all "zeroes", a pseudorandom generator, etc.). Other techniques for determining whether a memory fault is correctable or uncorrectable will be readily appreciated by those of ordinary skill in the related arts.

As shown in FIG. 7, when the memory has an excessive amount of faults and the faults (or a significant fraction thereof) can be corrected, then the memory can be refreshed and/or re-characterized (step 706). As previously noted, refreshing the memory may be performed by re-writing the memory contents (e.g., the current DAG or a portion thereof) to the memory. In one exemplary embodiment, the memory contents are copied from a presumed pristine copy (e.g., such as from the validation memory). In other embodiments, the memory contents (or a portion thereof) may be generated from scratch (e.g., such as where there is no validation stage memory).

In some variants, the refreshed portion may be identical to its prior contents. In other variants, the memory may be written with a different pattern (e.g., to wear-level memory usage). For example, within the context of an Ethereum DAG, a refreshed sector of memory may receive a different portion of the DAG. Juggling the Ethereum DAG over the entire surface of a characterized memory may further allow for longer usable life since each cell is probabilistically allocated different values over time.

Furthermore, the memory may be re-characterized where some faults are uncorrectable or where performance can be improved by adjusting other operational parameters (e.g., clock rate, voltage, etc.). For example, a memory that only needs to operate at a BER of $1\times10^{-5}$ can be re-characterized to run at a slower clock rate, higher voltages, etc. By using less aggressive operational parameters, the performance of the memory can be improved and/or the usable life can be extended.

Moreover, artisans of ordinary skill in the related arts will readily appreciate that a greater number of hard errors merely reduces the acceptable margin of soft errors. As a related corollary, since the margin of soft errors reduces as hard errors accumulate, the memory degradation can be accurately managed throughout the entire duration of its usable life. In other words, the frequency of memory refreshing will increase as the memory degrades. When the cost of refreshing and/or re-characterizing the memory approaches (or outweighs) the benefits of keeping the memory in service, then the memory can be removed from service permanently.

For example, assume that a memory is running at $1\times10^{-5}$ BER (90% efficiency). Operational parameters for the memory may be set aggressively until it falls below 85% efficiency (indicating that the memory's performance is slipping down the curve of FIG. 2C). At that point, the memory may be re-characterized for less aggressive clock rates and/or voltages (returning to the 90% efficiency).

At step 708 of the method 700, when the memory has an excessive amount of faults and the faults (or a significant portion thereof) are uncorrectable, then the memory should be replaced.

While the foregoing discussion is presented within the context of DRAM memory technologies, artisans of ordinary skill in the related arts given the contents of the present disclosure will readily appreciate that other memory technologies may be substituted with equivalent success. For example, Flash memory is non-volatile memory that does not "refresh", however Flash memory designates a set of sectors to replace broken cells; the replacement cells can be "fused" in. The Flash memory usable life ends when all of the fuses have been consumed. Analogous techniques can be used within other memory technologies such as FeRAM and/or 3D memories.

Searching Apparatus

Figure 8:
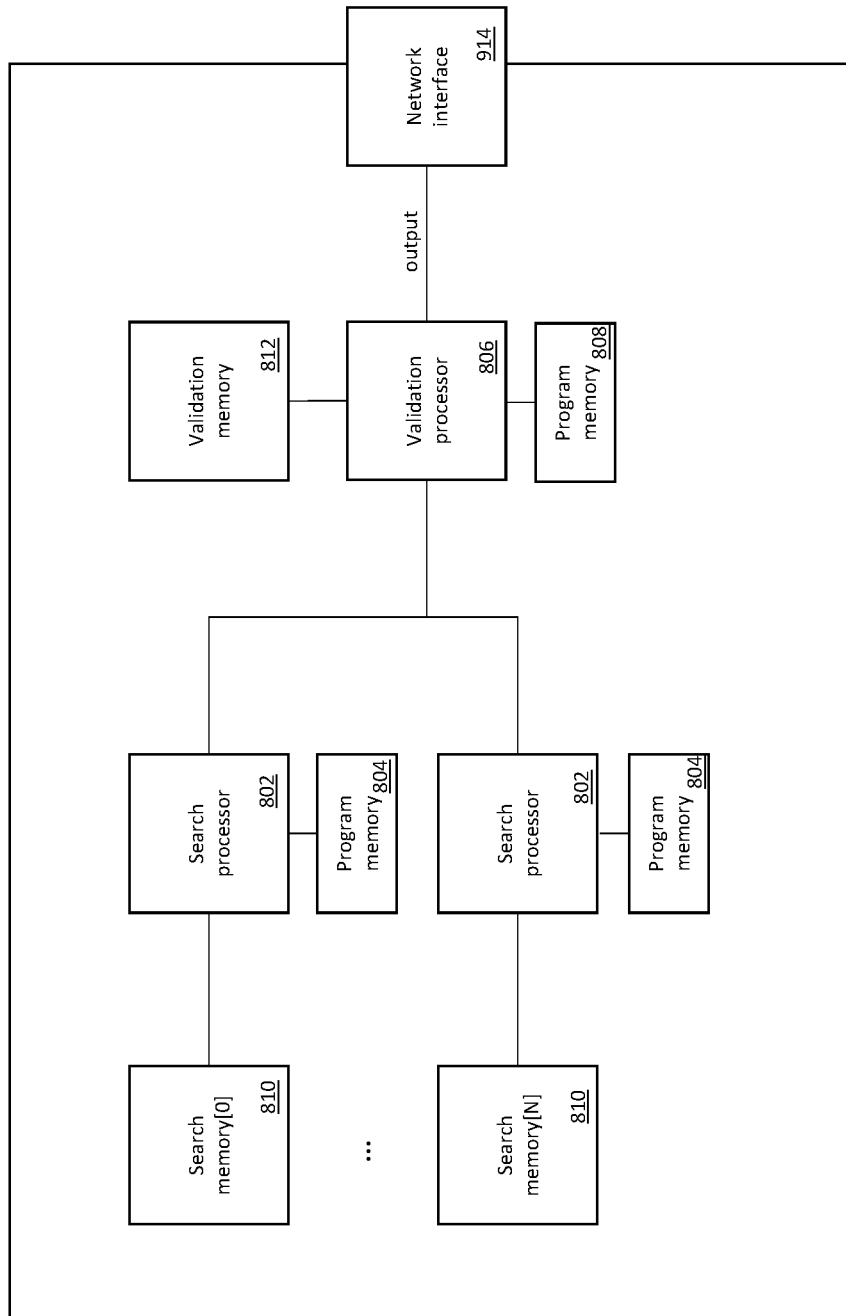
FIG. 8 is a logical block diagram of an exemplary embodiment of an apparatus configured to search characterized memory, in accordance with the present disclosure.

FIG. 8 illustrates an exemplary apparatus 800 configured according to the present disclosure. As shown, the exemplary apparatus 800 includes, inter alia, one or more search processor apparatus or subsystem 802 and corresponding non-transitory computer readable medium 804 that stores instructions configured to implement a search. Additionally the exemplary apparatus 800 may include, inter alia, one or more validation and/or verification processor apparatus or subsystem 806 and corresponding non-transitory computer readable medium 808 that stores instructions configured to validate and/or verify the results of the searches.

In one exemplary embodiment, the exemplary apparatus 800 includes one or more front end network interfaces 814 for communication with network entities (e.g., other miners). In one such variant, the network interface 814 is a wired network interface. In another such variant, the network interface 814 includes a radio frequency (RF) device having, inter alia, antenna and one or more RF tuners.

The RF antenna(s) are configured to detect and transmit and receive signals from radio access technologies (RATs) in the service area or venue with which the validation apparatus is associated. For example, LTE (including, e.g., LTE, LTE-A, LTE-U, LTE-LAA) signals may be used as the basis of communication between the validation apparatus (806, 808) and the various other devices (e.g., other miners). The antenna(s) may include multiple spatially diverse individual elements in e.g., a MIMO- or MISO-type configuration, such that spatial diversity of the transmitted and/or received signals can be utilized.

In one such implementation, the radio interface(s) include one or more LTE-based radios compliant with 3GPP. Additional unlicensed, licensed, or quasi-licensed air interfaces may also be used within the exemplary apparatus 800, including e.g., Wi-Fi, non-CBRS band LTE, 5G NR, or others. Moreover, the LTE radio functionality may be extended to incipient 3GPP-based 5G NR protocols; e.g., at maturation of LTE deployment and when 5G NR-enabled handsets are fielded, such adaptation being accomplished by those of ordinary skill given the contents of the present disclosure.

As a brief aside, NG-RAN or "NextGen RAN (Radio Area Network)" is part of the 3GPP "5G" next generation radio system. 3GPP is currently specifying Release 15 NG-RAN, its components, and interactions among the involved nodes including so-called "gNBs" (next generation Node B's or eNBs). NG-RAN will provide very high-bandwidth, very low-latency (e.g., on the order of 1 ms or less "round trip" time for sending a communication and receiving a response) wireless communication and efficiently utilize, depending on application, both licensed and unlicensed spectrum of the type described supra in a wide variety of deployment scenarios, including indoor "spot" use, urban "macro" (large cell) coverage, rural coverage, use in vehicles, and "smart" grids and structures. NG-RAN will also integrate with 4G/4.5G systems and infrastructure, and moreover new LTE entities are used (e.g., an "evolved" LTE eNB or "eLTE eNB" which supports connectivity to both the EPC (Evolved Packet Core) and the NR "NGC" (Next Generation Core).

As a brief aside, the memory bound techniques described herein are particularly synergistic in the context of wireless applications (and other processor and/or power limited environments). "Processor hard" and "processor bound" algorithms inherently require abundant processing cycles (and power). Unfortunately, wireless devices often time share processing power for communication protocol stacks and applications. Moreover, most wireless devices run on battery power, which imposes very strict power consumption limitations. In contrast, memory hard algorithms can be performed with relatively little computational complexity and likely less power.

Incipient wireless technologies have expanded with each iteration (e.g., 3G, 4G, and 5G) to cover a broader and broader ecosystem of devices; modern wireless technologies will span from commodity type modems (e.g., in Internet-of-Things (IoT)) to high-end modems. Additionally, many intended use-cases that are under discussion for e.g., 5G are based on the passive collection of data by many commodity type modems, often under circumstances that are noisy, untrusted, prone to malicious attack. Blockchain algorithms are designed for exactly these untrusted scenarios. Consequently, the memory hard blockchain solutions described herein will enable a variety of incipient and future wireless applications.

In an exemplary embodiment, the processors 802 and/or 806 may include one or more of a digital signal processor, microprocessor, field-programmable gate array, or plurality of processing components mounted on one or more substrates. The processor 802 and/or 806 may also include an internal cache memory, and is in communication with a memory subsystems 804 and/or 808, which can include, e.g., SRAM, DRAM, flash and/or SDRAM components. The memory subsystems may implement one or more of DMA type hardware, so as to facilitate data accesses as is well known in the art.

In one embodiment, the search memory 810 is characterized to provide a range of performances over a range of operating parameters. In some embodiments, the search memories may be second-class (or even lower class) memories which suffer from defects (due to fabrication, or refurbishment). In other embodiments, the search memories may be first-class memories that are characterized for a range of operating parameters. In some variants, the search memories may be overclocked and/or operated at higher voltages to increase performance.

Additionally, it is noted that although the exemplary apparatus of FIG. 8 shows single unified structure 800 that includes both searching apparatus (802, 804) and validation/verification apparatus (806, 808), other embodiments of the present disclosure may further separate such entities within multiple devices in data communication with each other.

In some embodiments, the validation processor 806 utilizes memory 808 or other storage to temporarily hold a number of data reports or files to monitor and analyze performances of the searching apparatus (802, 804). Data stored may relate for example to performance metrics (e.g., error rates, efficiency, etc.) useful to analyze performance, and in one exemplary embodiment, issue a maintenance command to various ones of the searching processors 802 to cause, e.g., a system refresh and/or trigger replacement.

In one exemplary embodiment, processors (802, 806) may be in data communication with a display (not shown). For example, a touch screen display can be used to send and receive user input. Common examples of user input may include e.g., changes to operational parameters, replacement notifications, hot-swapping notifications, solution generation parameters, solution notifications, monitoring and/or other analysis. In such embodiment, the display may include a touch screen and a touch screen controller. Other user interfaces can be included, such as a keyboard and a mouse, which may be coupled via an embedded controller to a communications hub.

In some implementations, the exemplary apparatus 800 can be configured with application-specific agents, adapters, packagers, decryptor's/encryptors, or other components configured to process the data of the block such that the data is adapted for presentation or viewing, according to the specific formats if desired. For example, the validation apparatus can use a local adapter to convert, if necessary, the data of the block from its format to a presentation format (e.g., HTML5, Flash, etc.) that is consumable by another miner (or viewable by a human observer).

Various implementations of the foregoing may be used in conjunction with the methods and apparatus described in co-owned and co-pending U.S. patent application Ser. No. 16/242,960, filed Jan. 8, 2019, and entitled "METHODS AND APPARATUS FOR ROUTINE BASED FOG NETWORKING", incorporated supra. As described therein, multiple devices may be assigned routine rules and/or routine trigger conditions that establish a fog network. Memory hard applications can be used to generate, secure, and/or record such transactions via a ledger-based control plane operation; these variants do not require central network management. As a result, characterized memory operation may be used to greatly accelerate and/or reduce the expense of such systems described therein.

Still other implementations of the foregoing may be used in conjunction with the methods and apparatus described in co-owned and co-pending U.S. patent application Ser. No. 16/211,029, filed Dec. 5, 2018, and entitled "METHODS AND APPARATUS FOR INCENTIVIZING PARTICIPATION IN FOG NETWORKS", incorporated supra. As described therein, devices of a fog network may provide for example, computational, storage, and/or network resources in exchange for fungible tokens. The user contributions are recorded in e.g., a memory hard blockchain data structure, thereby enabling users to be compensated for their contributions of resources to the network at a later time. Some variants described therein may also use asymmetric memory hard verification and/or validation of work performed by peer devices. Characterized memory operation described herein may synergistically be combined therewith.

Alternative Applications for Memory Searching

As explained above, validating results from unreliable memory for POW-based mining of cryptocurrencies (e.g., Ethereum) is just one exemplary application contemplated by the present disclosure. The various techniques described hereinafter may be suitable for a range of applications.

Exemplary Blockchain Operation

While the foregoing discussion has been directed to the use of blockchains within cryptocurrencies, artisans of ordinary skill in the related arts will readily appreciate, given this disclosure, that blockchain based data structures may be useful in any scenario where many untrusted peer devices trust a common shared ledger of transactions. More directly, by providing memory hard POW techniques that can be implemented within a wide variety of characterized memory devices (e.g., at low cost or no cost), the various techniques described herein may enable an entirely new ecosystem of trusted device-to-device transactions. For example, the blockchain technology described above may be readily used in any fog-based wireless network (e.g., where many devices at the edge of the network directly communicate with one another without the benefit of a centralized network entity) or other "mesh" type networks.

In one exemplary embodiment, fog-networking or the Internet-of-Things (IoT) can be used with the validation/searching systems described herein. For example, the validating and searching apparatuses/memories described herein can include fog-based or cloud-based devices. Trusted localized data transactions can enable communications to devices in close proximity, enable dense geographical distributions (e.g., rather than bottlenecking communications through a central communications hub), and allow for local resource pooling (sharing memory and processing resources with blockchain based transactions). Moreover, edge based communication can reduce latency and reliance on network backhaul bandwidth to achieve better quality of service (QoS), and/or edge analytics/stream mining. The foregoing features improve the user-experience directly and can also indirectly provide redundancy in case of failure.

For example, rather than downloading a media file (e.g., a TV show, popular songs, etc.) from a central content database, a device may be able to obtain the media file directly from a nearby peer-device that has already downloaded the media file. The direct transaction can be encrypted with asymmetric key encryption, and the entire transaction can be captured in a blockchain. The blockchain can later be reviewed by the central content database to appropriately charge and/or implement digital rights management (DRM) techniques.

Artisans of ordinary skill in the related arts given the contents of the present disclosure will readily appreciate that the foregoing example is purely illustrative; the various techniques described herein may find broad applicability in any applications for memory hard blockchain data structures.

Exemplary Social Media Network Operations

As noted above, the potential applications for blockchain data structures may be very wide ranging. One such application is social networking, where the computing power and/or memory of the apparatus/system of the present disclosure can be used to store a user's data in blockchain repositories that can be trusted, encrypted, and widely disseminated.

In one exemplary embodiment, a social media network based on blockchain data structures could be disseminated and held by many parties in an open ledger type format in exchange for e.g., cryptocurrency or other compensation. Unlike centralized social networking platforms that sell user data for profit, the distributed social media network may be privacy-focused such that a user would be provided with control over how their data is used, mined, and/or sold. Moreover, the user may have the ability to opt-in or opt-out of how data is collected.

In contrast to advertisement or data selling schemes, the present disclosure contemplates users earning and spending cryptocurrency or other financial instruments (which can be unique to the social media network). In some variants, the user may be able to earn money for viewing targeted advertisements, patronizing businesses, and/or "taste making". In some variants, the user may be able to buy and/or sell goods and/or pay for services (regardless of whether it the transaction is user-to-user, user-to-business, business-to-business, or business-to-user or charity-based). Such a social network may utilize memory hard databases and provide fluid virtualized transactions for e.g., publishers (e.g., journalists) and content creators.

Moreover, in some embodiments, a digital currency mined using the systems of the present disclosure could be used to run/financed the social media network, as well as be used for transactions made through the social media network. Such a cryptocurrency could even be created specifically for, and unique to, the social media network.

Artisans of ordinary skill in the related arts given the contents of the present disclosure will readily appreciate that the foregoing example is purely illustrative; the various techniques described herein may find broad applicability in any applications for de-centralized user controlled social networking.

Exemplary Probabilistic Computing or Machine Learning Operation

Artisans of ordinary skill in the related arts will readily appreciate that memory searches in data structures may be useful in any scenario which is error-tolerant, or otherwise accounts for errors. As more and more data that is gathered to further automate tasks, much of this data may include noise. Error-tolerant techniques are commonly used in probabilistic computing or machine learning applications. More directly, probabilistic computing or machine learning expects, and is designed to tolerate, noisy data.

Consider an exemplary scenario of a machine learning traffic light that dynamically adjusts traffic flow based on a variety of use considerations (e.g., the flow of cars, bicycles and pedestrians, the time of day, the day of the week, etc.). Under such a scenario, the traffic light may have an associated solution density function that maximizes efficiency (e.g., wait time) as a function of usage (e.g., number of cars, bicycles, and/or pedestrians). The machine learning traffic light can collect data from multiple sensors relating to the aforementioned considerations (for example, crosswalk use, pressure plate sensors, etc.) Due to the inexpensive nature of sensors as well as errant human behavior, data capture is also likely to capture noise as well (e.g., incorrectly identifying bicycles as cars, or pedestrians as bicycles, etc.)

During operation, the machine learning traffic light can infer patterns of use and dynamically adjust for differences in data and/or noise associated with cars, bicyclists and pedestrians collected over long periods of time. Historical patterns may be used to estimate a certain number of bicyclists at a particular intersection at a moment (e.g., a given day and at a given time) within probabilistic ranges. Additionally, however, errant or noisy data can be identified and ignored or otherwise adjusted. For example, when 500 bicyclists are expected to pass through a particular intersection on an afternoon and roughly that number are measured by a first detector. A second detector that reports 7000 (during the same interval) can be flagged as being inaccurate. More generally, since traffic use is optimized with a solution density function, data that deviates significantly from the expected solution density function can be flagged and ignored/remedied.

Artisans of ordinary skill in the related arts given the contents of the present disclosure will readily appreciate that the foregoing example is purely illustrative; the various techniques described herein may find broad applicability in any applications for probabilistic and/or machine learning computations.

Other Exemplary Uses for Invalid Solutions

In the prior discussions, valid POW solutions were broadcasted to the network and invalid solutions were ignored. As noted above, invalid solutions would be construed by untrusting peer miners as e.g., a failed malicious attempt. However, in a community of miners that trust one another, invalid POW solutions may be used in proving that actual work was being done (e.g., mining was being performed) even though no valid solutions were found. More directly, "near misses" may still have significantly less value than a valid solution, but they may have some value more than nothing. More directly, a "near miss" solution is still evidence of real work that was done; however, because it cannot be validated by an external party, it is not fungible outside of the trusted context.

Consider the exemplary scenario where Company A hires Company B for X duration (e.g., an epoch) to mine for solutions, and the expected outcome for that task is that Y valid solutions (e.g., 20) should be found in that X duration, within a certain predefined space of memory. As previously noted, mining is a probabilistic process and it is possible that Company B only finds half of the valid solutions that were contracted for. Under such conditions, Company A might assume Company B only did half of the contracted work or worked for half of the contracted time, unless Company B can prove otherwise.

One way to prove that actual work was performed is for Company B to provide Company A with the "near misses".

A randomly generated string of random numbers and letters (representative of the hash function) cannot be verified and would be easily debunked, however near misses can be verified (even where they cannot be validated).

Additionally, the density function of a "near miss" can be used to determine how much work was actually done and the "exchange rate" for near misses to valid solutions. As a brief aside, artisans of ordinary skill in the probability arts will recognize that the density function of the solution is low (i.e., it is difficult to find a solution) when there is a lot of variance. A "near miss" may have a density function variance that may be ten times or a hundred times greater than valid solutions (a near miss is easier to find), but it is more than zero (i.e., better than no credit).

In the aforementioned scenario, Company B may show that they have not breached any contractual obligations to Company A and acted in good faith. As a result Company A could provide Company B with contractual compensation for the POW solutions that were found and possibly a prorated compensation for the showing of their good faith work effort during the contracted time. More directly, the ability to use near misses as a lesser form of POW reduces the contractual uncertainty of probabilistic activities, thereby improving the negotiation of terms.

Artisans of ordinary skill in the related arts given the contents of the present disclosure will readily appreciate that the foregoing example is purely illustrative; the various techniques described herein may find broad applicability in any applications for evidencing memory hard work and/or business models that contractually specify memory hard work obligations.

It will be recognized that while certain aspects of the disclosure are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the disclosure disclosed and claimed herein.

While the above detailed description has shown, described, and pointed out novel features of the disclosure as applied to various embodiments, it will be understood that various omissions, substitutions, and changes in the form and details of the device or process illustrated may be made by those skilled in the art without departing from the disclosure. This description is in no way meant to be limiting, but rather should be taken as illustrative of the general principles of the disclosure. The scope of the disclosure should be determined with reference to the claims.

It will be further appreciated that while certain steps and aspects of the various methods and apparatus described herein may be performed by a human being, the disclosed aspects and individual methods and apparatus are generally computerized/computer-implemented. Computerized apparatus and methods are necessary to fully implement these aspects for any number of reasons including, without limitation, commercial viability, practicality, and even feasibility (i.e., certain steps/processes simply cannot be performed by a human being in any viable fashion).

What is claimed is:

1. A method, comprising:
   characterizing a memory apparatus;
   determining a solution density function associated with the memory apparatus, the solution density function representative at least of a probability of finding a valid solution for an application within a solution space;

generating one or more solutions based at least on a characterized rate, the characterized rate based at least on the solution density function;

validating the one or more solutions; and utilizing the one or more solutions having been validated in association with the application.

2. The method of claim 1, wherein the characterizing of the memory apparatus comprises determining one or more levels of (i) actual performance, or (ii) predicted performance over a range of (a) conditions or (b) operational parameters.

3. The method of claim 1, wherein:
the application comprises an error-tolerant application; and
the determining of the solution density function associated with the memory apparatus comprises determining an error level that can be tolerated before the error-tolerant application fails in the error-tolerant application.

4. The method of claim 1, wherein:
the application comprises a probabilistic or stochastic application; and
the determining of the solution density function associated with the memory apparatus comprises determining a noise floor below which a signal of interest is indistinguishable from noise in the probabilistic or stochastic application.

5. The method of claim 1, wherein:
the application comprises a machine learning system or artificial intelligence system; and
the determining of the solution density function associated with the memory apparatus comprises determining a maximal sparsity of information above which a processing complexity is infeasible to model in the machine learning system or artificial intelligence system.

6. The method of claim 1, wherein the generating of the one or more solutions based at least on the characterized rate comprises executing at least one of a search or hash algorithm to generate a proof of work (POW)-based solution from the memory apparatus.

7. The method of claim 6, wherein the utilizing the one or more solutions comprises causing a general compute memory to execute, at a rate specified for the general compute memory, a one-time look up verification of the POW-based solution.

8. The method of claim 6, wherein the utilizing the one or more solutions comprises providing the validated POW-based solution to at least one peer entity of a blockchain-based network.

9. The method of claim 1, wherein the generating of the one or more solutions is based at least on an overclocking rate under an acceptable bit error rate (BER).

10. A non-transitory computer storage medium storing instructions which, when executed in a computing system, causes the computing system to perform a method, comprising:
characterizing a memory apparatus;
determining a solution density function associated with the memory apparatus, the solution density function representative at least of a probability of finding a valid solution for an application within a solution space;
generating one or more solutions based at least on a characterized rate, the characterized rate based at least on the solution density function;
validating the one or more solutions; and
utilizing the one or more solutions having been validated in association with the application.

11. The non-transitory computer storage medium of claim 10, wherein the characterizing of the memory apparatus comprises determining one or more levels of actual or predicted performance over a range of conditions or operational parameters.

12. The non-transitory computer storage medium of claim 10, wherein:
the application comprises an error-tolerant application; and
the determining of the solution density function associated with the memory apparatus comprises determining an error level that can be tolerated before the error-tolerant application fails in the error-tolerant application.

13. The non-transitory computer storage medium of claim 10, wherein:
the application comprises a probabilistic or stochastic application; and
the determining of the solution density function associated with the memory apparatus comprises determining a noise floor below which a signal of interest is indistinguishable from noise in the probabilistic or stochastic application.

14. The non-transitory computer storage medium of claim 10, wherein:
the application comprises a machine learning system or artificial intelligence system; and
the determining of the solution density function associated with the memory apparatus comprises determining a maximal sparsity of information above which a processing complexity is infeasible to model in the machine learning system or artificial intelligence system.

15. The non-transitory computer storage medium of claim 10, wherein the generating of the one or more solutions based at least on the characterized rate comprises executing at least one of a search or hash algorithm to generate a proof of work (POW)-based solution from the memory apparatus.

16. The non-transitory computer storage medium of claim 15, wherein the utilizing the one or more solutions comprises causing a general compute memory to execute, at a rate specified for the general compute memory, a one-time look up verification of the POW-based solution.

17. The non-transitory computer storage medium of claim 15, wherein the utilizing the one or more solutions comprises providing the validated POW-based solution to at least one peer entity of a blockchain-based network.

18. The non-transitory computer storage medium of claim 10, wherein the generating of the one or more solutions is based at least on an overclocking rate under an acceptable bit error rate (BER).

19. A computing system, comprising:
a memory apparatus; and
at least one processor coupled to the memory apparatus and configured to:
characterize the memory apparatus;
determine a solution density function associated with the memory apparatus, the solution density function representative at least of a probability of finding a valid solution for an application within a solution space;
generate one or more solutions based at least on a characterized rate, the characterized rate based at least on the solution density function;

validate the one or more solutions; and
utilize the one or more solutions having been validated in association with the application.

20. The computing system of claim 19, wherein the at least one processor is further configured to monitor a performance of the memory apparatus based on the solution density function to detect a fault in the memory apparatus.

* * * * *